United States Patent
Kubota et al.

(10) Patent No.: US 8,395,740 B2
(45) Date of Patent: Mar. 12, 2013

(54) LIQUID CRYSTAL DISPLAY DEVICE HAVING BLUE PHASE LIQUID CRYSTAL AND PARTICULAR ELECTRODE ARRANGEMENT

(75) Inventors: Daisuke Kubota, Kanagawa (JP); Tetsuji Ishitani, Kanagawa (JP); Akio Yamashita, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 558 days.

(21) Appl. No.: 12/690,134

(22) Filed: Jan. 20, 2010

(65) Prior Publication Data

US 2010/0195028 A1    Aug. 5, 2010

(30) Foreign Application Priority Data

Jan. 30, 2009    (JP) .................... 2009-018995

(51) Int. Cl.
- G02F 1/1343 (2006.01)
- G02F 1/1335 (2006.01)
- G02F 1/1333 (2006.01)

(52) U.S. Cl. ......... 349/141; 349/106; 349/110; 349/139

(58) Field of Classification Search .............. 349/141, 349/106, 110, 139
See application file for complete search history.

(56) References Cited

U.S. PATENT DOCUMENTS

| | | | |
|---|---|---|---|
| 6,097,465 A | 8/2000 | Hiroki et al. | |
| 6,175,395 B1 | 1/2001 | Yamazaki et al. | |
| 7,211,825 B2 | 5/2007 | Shih et al | |
| 7,327,433 B2 | 2/2008 | Miyachi et al. | |
| 7,342,632 B2 | 3/2008 | Miyachi et al. | |
| 7,576,829 B2 | 8/2009 | Kikuchi et al. | |
| 2005/0179847 A1* | 8/2005 | Miyachi et al. | 349/141 |
| 2006/0203169 A1 | 9/2006 | Ozawa et al. | |
| 2006/0227283 A1 | 10/2006 | Ooi et al. | |
| 2007/0070282 A1* | 3/2007 | Shibahara et al. | 349/141 |
| 2007/0126969 A1 | 6/2007 | Kimura et al. | |
| 2007/0287079 A1* | 12/2007 | Li et al. | 430/7 |
| 2008/0259254 A1 | 10/2008 | Kikuchi et al. | |
| 2009/0153761 A1 | 6/2009 | Park et al. | |
| 2010/0165280 A1 | 7/2010 | Ishitani et al. | |
| 2010/0195028 A1 | 8/2010 | Kubota et al. | |
| 2010/0245724 A1 | 9/2010 | Nishi et al. | |

FOREIGN PATENT DOCUMENTS

| | | |
|---|---|---|
| JP | 2008-112022 | 5/2008 |
| WO | WO 2005-090520 A1 | 9/2005 |

* cited by examiner

*Primary Examiner* — Michael Caley
(74) *Attorney, Agent, or Firm* — Nixon Peabody LLP; Jeffrey L. Costellia

(57) ABSTRACT

In a liquid crystal display device including a blue phase liquid crystal layer, first and second common electrode layers, which are positioned to face each other, sandwich the blue phase liquid crystal layer therebetween and have opening patterns (slits), and a pixel electrode layer has an opening pattern. The pixel electrode layer is formed over a structure body which projects into the liquid crystal layer from a surface of a first substrate on a liquid crystal layer side, and the pixel electrode layer is positioned between the first and second common electrode layers in the liquid crystal layer. Electric fields are applied between the pixel electrode layer and the first and second common electrode layers, so that the electric fields are formed in the entire liquid crystal layer and liquid crystal molecules can be controlled by using the electric fields.

30 Claims, 24 Drawing Sheets

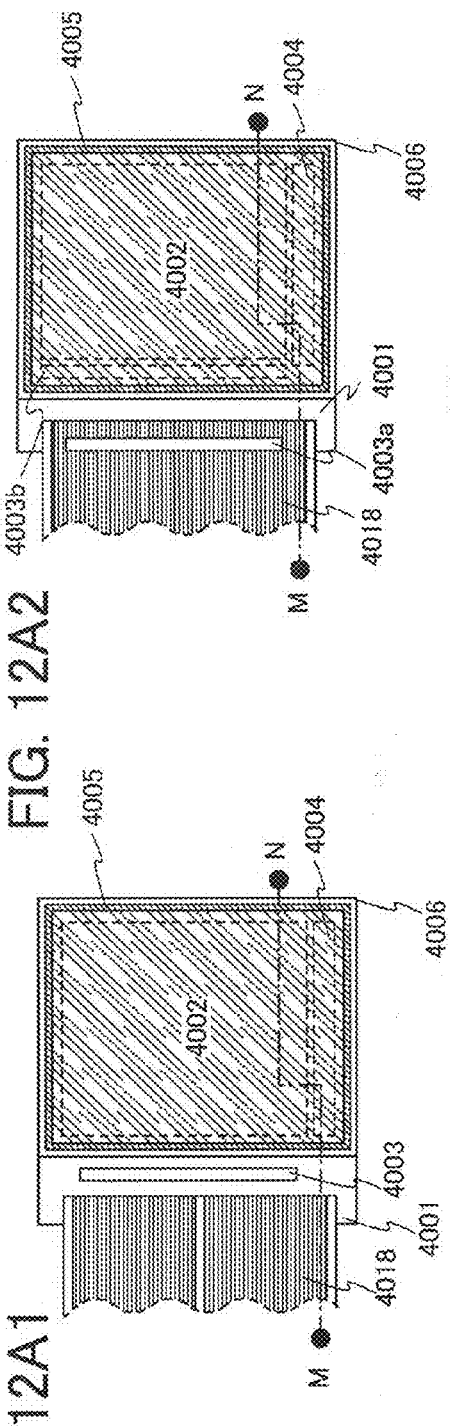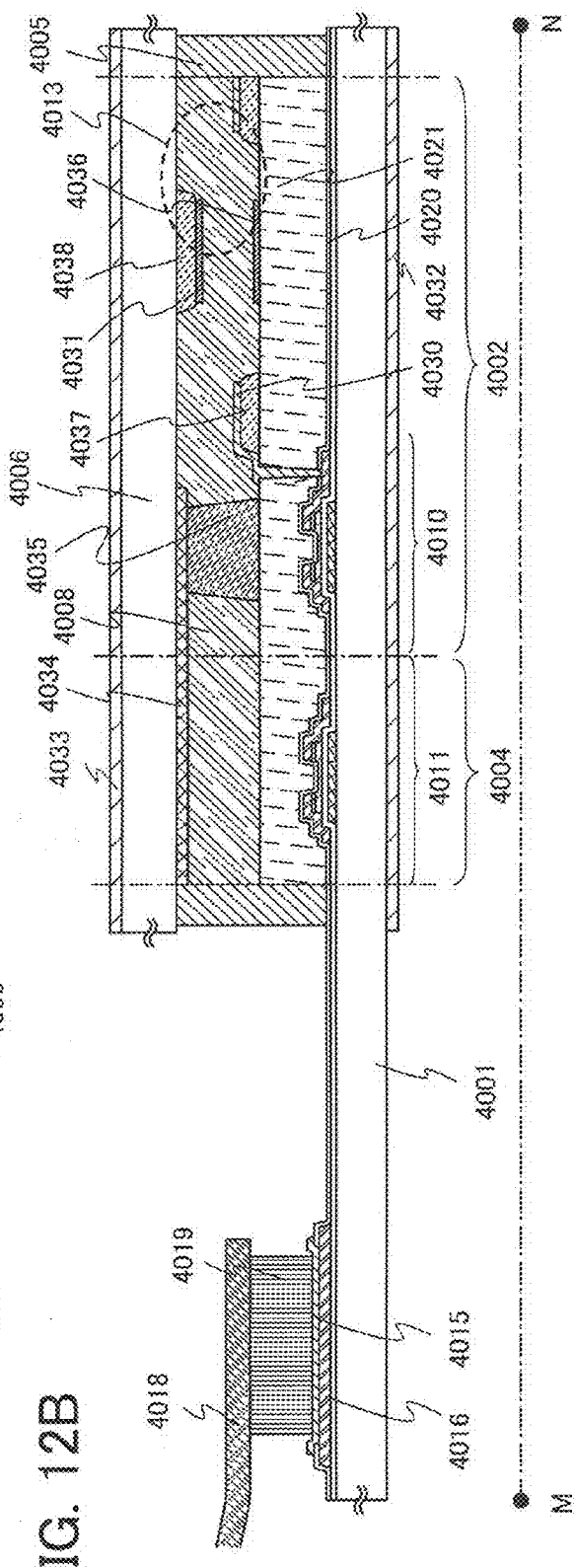
FIG. 12A1　FIG. 12A2　FIG. 12B

LIQUID CRYSTAL DISPLAY DEVICE HAVING BLUE PHASE LIQUID CRYSTAL AND PARTICULAR ELECTRODE ARRANGEMENT

BACKGROUND OF THE INVENTION

1. Field of the Invention

The present invention relates to a liquid crystal display device and a method for manufacturing the liquid crystal display device.

2. Description of the Related Art

A liquid crystal display device having a liquid crystal element, a light emitting device having a self-light emitting element, a field emission display (FED), and the like has competed and developed in the market of display devices which are very thin and lightweight (so-called flat panel displays).

The increase in the response speed of liquid crystal molecules is required for liquid crystal display devices. A display mode of a liquid crystal has a variety of types, and among them, a ferroelectric liquid crystal (FLC) mode, an optical compensated birefringence (OCB) mode, and a mode using a blue phase liquid crystal can be given as a liquid crystal mode capable of high-speed.

In particular, with the use of a mode using a blue phase liquid crystal, an alignment film is not necessary and a viewing angle can be widened; thus, research for practical use has been promoted (for example, see Patent Document 1). Patent Document 1 reports that a liquid crystal is subjected to polymer stabilization treatment so that the temperature range where a blue phase is exhibited is increased.

REFERENCE

[Patent Document 1] PCT International Publication No. 05/090520

SUMMARY OF THE INVENTION

A problem for liquid crystal display devices is that high white transmittance (the ratio of light transmittance in white display) is necessary in order to achieve a high contrast.

Therefore, in order to achieve higher contrast, it is an object to provide a liquid crystal display device which is suitable for a liquid crystal display mode using a blue phase liquid crystal.

In a liquid crystal display device including a blue phase liquid crystal layer, a pair of common electrode layer (a first common electrode layer (a second electrode layer) and a second common electrode layer (a third electrode layer)), each of which has an opening pattern (slit), and a pixel electrode layer (a first electrode layer), which has an opening pattern, sandwich the blue phase liquid crystal layer. The common electrode layers are formed on a first substrate and a second substrate and positioned to face each other with the liquid crystal layer interposed therebetween.

A pixel electrode layer is formed over a structure body which projects into a liquid crystal layer from a surface of the first substrate on a liquid crystal layer side (a surface which faces the liquid crystal layer), and the pixel electrode layer is positioned between the first common electrode layer and the second common electrode layer in a thickness direction of the liquid crystal layer. When the pixel electrode layer is positioned between the first common electrode layer and the second common electrode layer, the first common electrode layer and the second common electrode layer may also be formed over the structure body. In this case, the pixel electrode layer and the second common electrode layer are formed over the same first substrate, and a structure body which is formed under the pixel electrode layer (a first structure body) is higher (thicker) than a structure body which is formed under the second common electrode layer (a third structure body).

The pixel electrode layer and the second common electrode layer which are formed over the first substrate (also referred to as an element substrate) and the first common electrode layer formed on the second substrate (also referred to as a counter substrate) are fixed to each other with a sealant with the liquid crystal layer interposed therebetween. The pixel electrode layer, the first common electrode layer, and the second common electrode layer have various opening patterns and have a shape including a bend portion and a comb shape which branches out, instead of a flat shape. Moreover, the first common electrode layer and the second common electrode layer have the same shape at least in a pixel region and are positioned so as to overlap each other with the liquid crystal layer'interposed therebetween.

Since the first and second common electrode layers and the pixel electrode layer, three of which are each provided with an opening pattern, sandwich a liquid crystal, electric fields are applied between the pixel electrode layer and the first common electrode layer and between the pixel electrode layer and the second common electrode layer, so that the electric fields are applied to the liquid crystal in an oblique direction (a direction oblique to the substrate). Thus, liquid crystal molecules can be controlled by using the electric fields. In addition, the electric field between the pixel electrode layer and the first common electrode layer and the electric field between the pixel electrode layer and the second common electrode layer can be applied to the liquid crystal because the pixel electrode layer is positioned between the first common electrode layer and the second common electrode layer in a thickness direction of the liquid crystal layer. Thus, electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance (light transmittance in black display) can also be increased.

The structure body can be formed using an insulator which uses an insulating material (an organic material and an inorganic material) and a conductor which uses a conductive material (an organic material and an inorganic material). Typically, a visible light curable resin, an ultraviolet curable resin, or a thermosetting resin is preferably used. For example, an acrylic resin, an epoxy resin, an amine resin, or the like can be used. Moreover, the structure body may be formed using a conductive resin or a metal material. Note that the structure body may have a stacked-layer structure of plural thin films. The structure body can have a columnar shape, a shape of a pyramid where the apex is made to be a plane so that the structure body has a trapezoidal shape in a cross-section, a dome shape where the tip is rounded, or the like. Furthermore, the structure body may be a portion which projects into the liquid crystal layer from a surface of the substrate on a liquid crystal layer side; thus, an interlayer film may be processed so that the surface on the liquid crystal layer side is uneven, whereby a projected structure body may be obtained. Accordingly, the structure body may be formed using a continuous film in which a plurality of projections is projected.

In this specification, an opening pattern (slit) formed in a pixel electrode layer, a first common electrode layer, and a second common electrode layer includes a comb-like pattern which is partly opened as well as a pattern which is opened in a closed space.

In this specification, a substrate which is provided with a thin film transistor, a pixel electrode layer, a second common electrode layer, and an interlayer film is referred to as an element substrate (a first substrate), and a substrate which is provided with a first common electrode layer which faces the element substrate with a liquid crystal layer interposed therebetween is referred to as a counter substrate (a second substrate).

A blue phase liquid crystal material is used for a liquid crystal layer. The blue phase liquid crystal material has a short response time of 1 msec or less and is capable of high-speed response. Thus, a high performance liquid crystal display device can be achieved.

The blue phase liquid crystal material includes a liquid crystal and a chiral agent. The chiral agent is used to align a liquid crystal such that the liquid crystal forms a spiral structure and to realize a blue phase. For example, a liquid crystal material mixed with a chiral agent at 5 wt % or more may be used for the liquid crystal layer.

As the liquid crystal, a thermotropic liquid crystal, a low molecular liquid crystal, a high molecular liquid crystal, a ferroelectric liquid crystal, an anti-ferroelectric liquid crystal, or the like is used.

For the chiral agent, a material which has a high compatibility with a liquid crystal and has a strong twisting power is used. In addition, as a material, either an R-enantiomer or an S-enantiomer is favorable, and a racemic body in which an R-enantiomer and an S-enantiomer are mixed at a ratio of 50:50 is not used.

The above liquid crystal materials exhibit a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are found in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be conducted in order to expand the temperature range. The polymer stabilization treatment is conducted in such a manner that a liquid crystal material including a liquid crystal, a chiral agent, a photocurable resin, and a photopolymerization initiator is irradiated with light having a wavelength with which the photocurable resin and the photopolymerization initiator are reacted. Such polymer stabilization treatment may be conducted by light irradiation of a liquid crystal material exhibiting an isotropic phase or by light irradiation of a liquid crystal material exhibiting a blue phase under the control of the temperature. For example, the polymer stabilization treatment is conducted in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C., preferably +5° C. from the phase transition temperature between the blue phase and the isotropic phase. The phase transition temperature between a blue phase and an isotropic phase refers to a temperature in transition from a blue phase to an isotropic phase when temperature is raised or a temperature in transition from an isotropic phase to a blue phase when temperature is reduced. As an example of the polymer stabilization treatment, the following method can be employed: after heating a liquid crystal layer to exhibit an isotropic phase, the temperature of a liquid crystal layer is gradually reduced so that the phase changes to a blue phase, and then, irradiation with light is conducted while the temperature at which a blue phase is exhibited is kept. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (with an isotropic phase exhibited). Moreover, in the case where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is conducted by irradiation with light at a temperature within +10° C., preferably +5° C. from the phase transition temperature between the blue phase and the isotropic phase (with an isotropic phase exhibited), the response time can be made as short as 1 msec or less and thus high-speed response is possible.

According to an embodiment of a structure of the invention disclosed in this specification, a liquid crystal display device includes: a first substrate and a second substrate between which a liquid crystal layer including a blue phase liquid crystal material is sandwiched; a structure body which projects into the liquid crystal layer from a surface of the first substrate on a liquid crystal layer side; a first electrode layer which is provided over the structure body and has an opening pattern; a second electrode layer which is provided between the second substrate and the liquid crystal layer and has an opening pattern; a third electrode layer which overlaps the second electrode layer, is provided between the first substrate and the liquid crystal layer, and has an opening pattern, wherein the structure body is provided in the opening pattern of the third electrode layer, and the firsts electrode is positioned between the second electrode layer and the third electrode layer in the liquid crystal layer.

According to another embodiment of a structure of the invention disclosed in this specification, a liquid crystal display device includes: a first substrate and a second substrate between which a liquid crystal layer including a blue phase liquid crystal material is sandwiched; a first structure body which projects into the liquid crystal layer from a surface of the first substrate on the liquid crystal layer side; a first electrode layer which is provided over the first structure body and has an opening pattern; a second structure body which projects into the liquid crystal layer from a surface of the second substrate on a liquid crystal layer side; a second electrode layer which is provided over the second structure body and has an opening pattern; a third electrode layer which overlaps the second electrode layer, is provided between the first substrate and the liquid crystal layer, and has an opening pattern, wherein the first structure body is provided in the opening pattern of the third electrode layer, and the first electrode layer is positioned between the second electrode layer and the third electrode layer in the liquid crystal layer.

According to another embodiment of a structure of the invention disclosed in this specification, a liquid crystal display device includes: a first substrate and a second substrate between which a liquid crystal layer including a blue phase liquid crystal material is sandwiched; a first structure body which projects into the liquid crystal layer from the surface of the first substrate on the liquid crystal layer side; a first electrode layer which is provided over the first structure body and has an opening pattern; a second structure body which projects into the liquid crystal layer from a surface of the second substrate on a liquid crystal layer side; a second electrode layer which is provided over the second structure body and has an opening pattern; a third structure body which projects into the liquid crystal layer from the surface of the first substrate on the liquid crystal layer side; a third electrode layer which overlaps the second electrode layer, is provided over the third structure body, and has an opening pattern, wherein the first structure body is provided in the opening pattern of the third electrode layer, and the first electrode layer is positioned between the second electrode layer and the third electrode layer in the liquid crystal layer.

Since a blue phase liquid crystal layer is used, it is not necessary to form an alignment film. Thus, a structure in which a pixel electrode layer (a first electrode layer) is in contact with a liquid crystal layer, and a second electrode layer (a first common electrode layer) and a third electrode layer (a second common electrode layer) are also in contact with the liquid crystal layer is obtained.

Note that the ordinal numbers such as "first" and "second" are used for convenience and do not denote the order of steps and the stacking order of layers. In addition, the ordinal numbers in this specification do not denote particular names which specify the invention.

Note that in this specification, semiconductor devices refer to all devices which can function by utilizing semiconductor characteristics, and electro-optical devices, semiconductor circuits, and electronic devices are all included in the category of the semiconductor devices.

In a liquid crystal display device using a blue phase liquid crystal layer, a contrast ratio can be increased.

BRIEF DESCRIPTION OF THE DRAWINGS

In the accompanying drawings:

FIGS. 12A1 and 12A2 are top views and FIG. 12B is a cross-sectional view each illustrating a liquid crystal display device;

DETAILED DESCRIPTION OF THE INVENTION

Figure 1A:
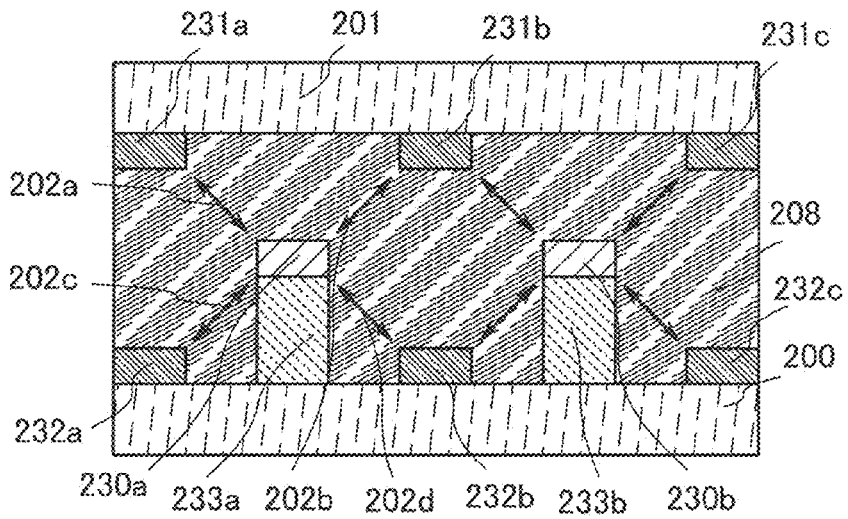
FIGS. 1A to 1C are cross-sectional views illustrating electric field modes of liquid crystal display devices.

Embodiments of the present invention will be described below with reference to the accompanying drawings. Note that the present invention is not limited to the description of the following embodiments, and it is readily appreciated by those skilled in the art that modes and details of the present invention can be modified in a variety of ways without departing from the spirit and scope of the present invention. Therefore, the present invention should not be construed as being limited to the description in the following embodiments. Note that in the structure of the present invention described below, reference numerals indicating the same portions and portions having a similar function are used in common in different drawings, and repeated descriptions thereof are omitted. Also, when a layer or the like is illustrated as a plurality of divided layers or the like in cross-sectional views, each of them or some of them may be designated by different reference numerals.

(Embodiment 1)

A liquid crystal display device is described with reference to FIGS. 1A to 1C, FIGS. 19A and 19B, FIGS. 20A and 20B, FIGS. 21A and 21B, FIGS. 22A and 22B, and FIGS. 23A and 23B.

Figure 1B:
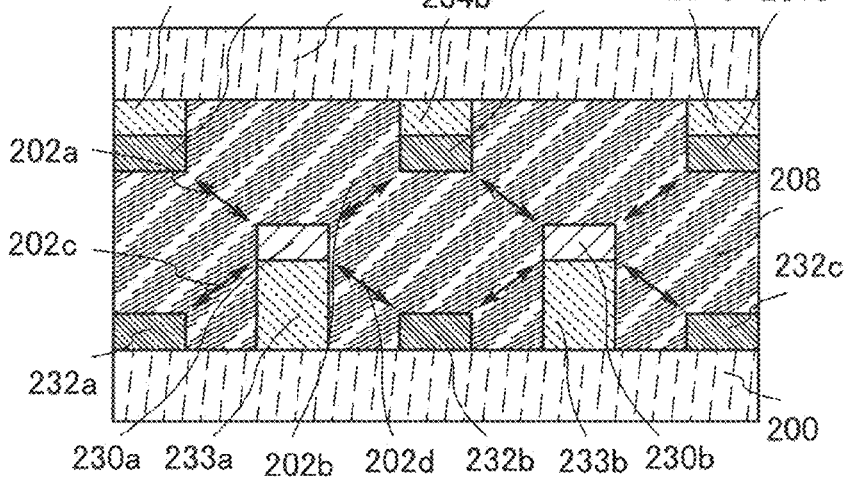
Figure 1C:
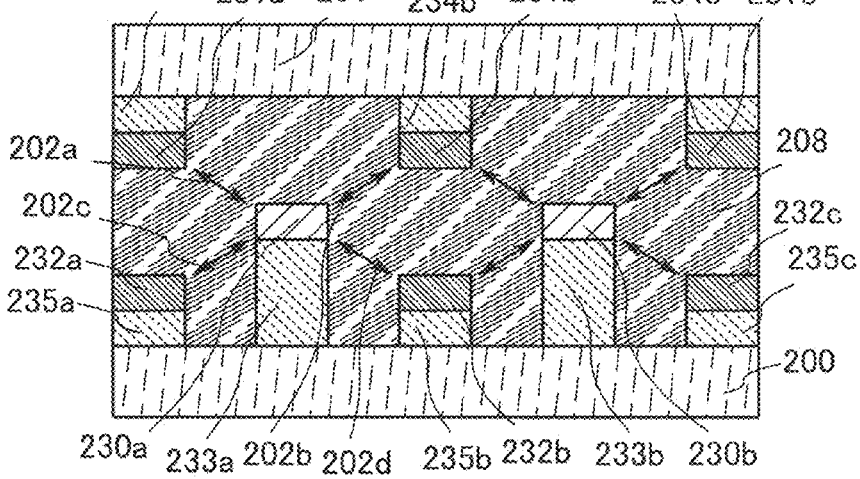

FIGS. 1A to 1C are cross-sectional views of liquid crystal display devices.

FIG. 1A illustrates a liquid crystal display device in which a first substrate 200 and a second substrate 201 are positioned to face each other with a liquid crystal layer 208 which uses a blue phase liquid crystal material sandwiched therebetween. First structure bodies 233a and 233b, pixel electrode layers 230a and 230b, and second common electrode layers 232a, 232b, and 232c are provided between the first substrate 200 and the liquid crystal layer 208. First common electrode layers 231a, 231b, and 231c are provided between the second substrate 201 and the liquid crystal layer 208. The first structure bodies 233a and 233b are provided so as to project into the liquid crystal layer 208 from a surface of the first substrate 200 on a liquid crystal layer 208 side.

The first substrate 200 is provided with the second common electrode layers 232a, 232b, and 232c and the second substrate 201 is provided with the first common electrode layers 231a, 231b, and 231c. The second common electrode layers 232a, 232b, and 232c and the first common electrode layers 231a, 231b, and 231e are positioned to face each other with the liquid crystal layer 208 interposed therebetween. It is preferable that the first common electrode layers 231a, 231b, and 231c and the second common electrode layers 232a, 232b, and 232c have the same shape at least in a pixel region and be positioned so as to overlap each other with the liquid crystal layer interposed therebetween so that the aperture ratio of a pixel is not reduced.

The pixel electrode layers 230a and 230b are formed over the first structure bodies 233a and 233b which are provided over the first substrate 200. In a thickness direction of the liquid crystal layer 208, the pixel electrode layer 230a is positioned between the first common electrode layer 231a and the second common electrode layer 232a and between the first common electrode layer 231b and the second common electrode layer 232b, and the pixel electrode layer 230b is positioned between the first common electrode layer 231b and the second common electrode layer 232b and between the first common electrode layer 231e and the second common electrode layer 232c. In addition, in the cross-sectional views in FIGS. 1A to 1C, the first common electrode layers 231a, 231b, and 231c, the second common electrode layers 232a, 232b, and 232c, and the pixel electrode layers are alternatively provided without overlapping each other.

The pixel electrode layer (including 230a and 230b), the first common electrode layer (including 231a, 231b, and 231c), and the second common electrode layer (including 232a, 232b, and 232c) each have a shape including an opening pattern instead of a flat shape; thus, they are illustrated as a plurality of divided electrode layers in the cross-sectional views.

If the pixel electrode layer is positioned between the first common electrode layer and the second common electrode layer, the first common electrode layer and the second common electrode layer may also be formed over the structure body. FIG. 1B illustrates an example in which second structure bodies 234a, 234b, and 234c are provided under the first common electrode layers 231a, 231b, and 231c. The second structure bodies 234a, 234b, and 234c are provided so as to project into the liquid crystal layer 208 from the surface of the second substrate 201 on the liquid crystal layer 208 side.

In addition, FIG. 1C illustrates an example in which third structure bodies 235a, 235b, and 235c are further provided under the second common electrode layers 232a, 232b, and 232c. The third structure bodies 235a, 235b, and 235c are provided so as to project into the liquid crystal layer 208 from the surface of the first substrate 200 on the liquid crystal layer 208 side. In this case, the pixel electrode layers 230a and 230b and the second common electrode layers 232a, 232b, and 232c are formed over the same first substrate 200, and the first structure bodies 233a and 233b which are formed under the pixel electrode layers 230a and 230b, respectively, are higher than the third structure bodies 235a, 235b, and 235c which are formed under the second common electrode layers 232a, 232b, and 232c, respectively. In such a manner, the thickness (height) and the number of the structure bodies are controlled, so that positions of the first common electrode layers, the second common electrode layers, and the pixel electrode layers in the liquid crystal layer can be set.

In the liquid crystal display devices in FIGS. 1A to 1C, the first common electrode layer (including 231a, 231b, and 231c) provided with an opening and the pixel electrode layer (including 230a and 230b) provided with an opening sandwich a liquid crystal, and the second common electrode layer (including 232a, 232b, and 232c) provided with an opening, and the pixel electrode layer (including 230a and 230b) sandwich a liquid crystal. Electric fields are applied between the following: between the pixel electrode layer 230a and the first common electrode layers 231a and 231b; between the pixel electrode layer 230b and the first common electrode layers 231b and 231c; between the pixel electrode layer 230a and the second common electrode layers 232a and 232b; and between the pixel electrode layer 230b and the second common electrode layers 232b and 232c, so that the electric fields are applied to the liquid crystal layer 208 in an oblique direction (a direction oblique to the substrate). Thus, liquid crystal molecules can be controlled by using the electric fields. In addition, in a thickness direction of the liquid crystal layer 208, the pixel electrode layer 230a is positioned between the first common electrode layers 231a and 231b and the second common electrode layers 232a and 232b, and the pixel electrode layer 230b is positioned between the first common electrode layers 231b and 231c and the second common electrode layers 232b and 232e. The electric fields between the following can be applied to the liquid crystal: between the pixel electrode layer 230a and the first common electrode layers 231a and 231b; between the pixel electrode layer 230b and the first common electrode layers 231b and 231c; between the pixel electrode layer 230a and the second common electrode layers 232a and 232b; and between the pixel electrode layer 230b and the second common electrode layers 232b and 232c. Thus, electric fields can be formed in the entire liquid crystal layer.

For example, in FIGS. 1A to 1C, an electric field indicated by an arrow 202a is applied between the pixel electrode layer 230a and the first common electrode layer 231a in an oblique direction, an electric field indicated by an arrow 202b is applied between the pixel electrode layer 230a and the first common electrode layer 231b in an oblique direction, an electric field indicated by an arrow 202c is applied between the pixel electrode layer 230a and the second common electrode layer 232a in an oblique direction, and an electric field indicated by an arrow 202d is applied between the pixel electrode layer 230a and the second common electrode layer 232b in an oblique direction.

Figure 19A:
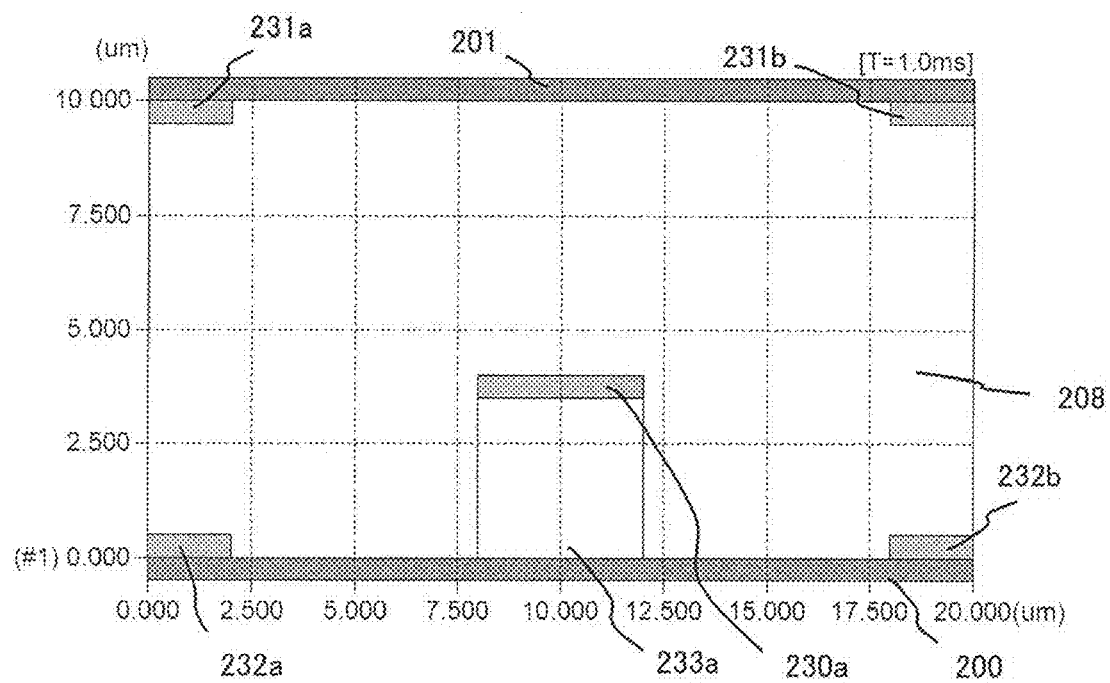
FIGS. 19A and 19B show calculation results of an electric field mode in a liquid crystal display device.
Figure 19B:
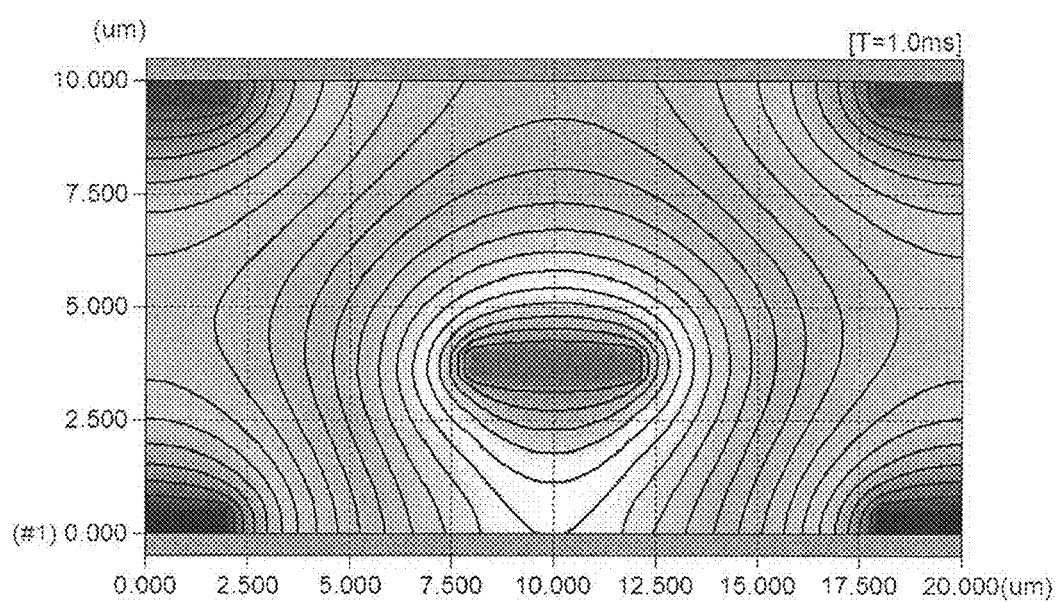
Figure 20A:
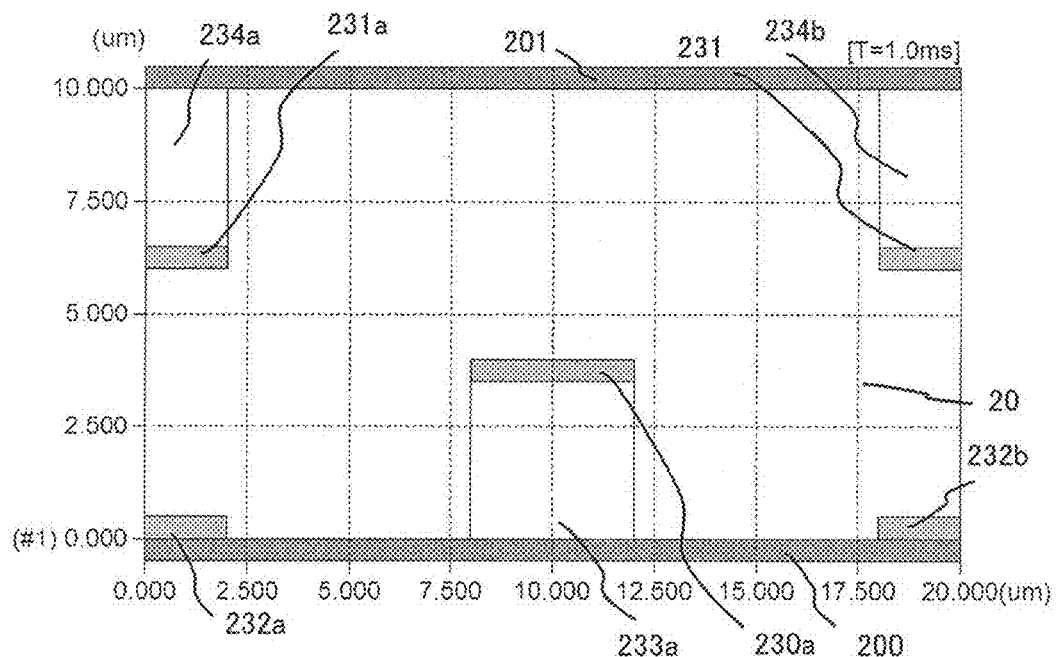
FIGS. 20A and 20B show calculation results of an electric field mode in a liquid crystal display device.
Figure 20B:
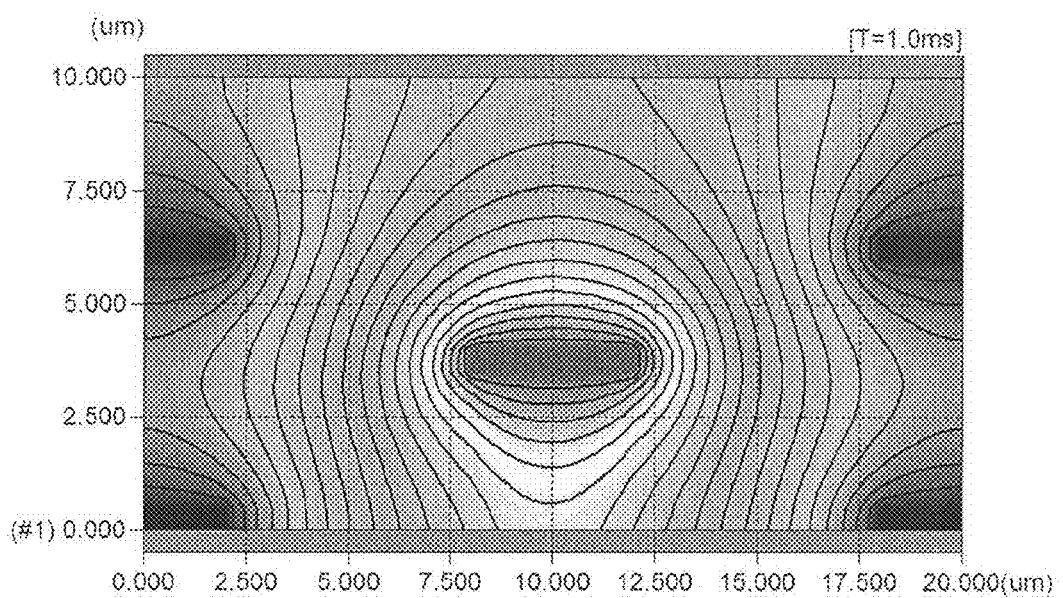

FIG. 19B, FIG. 20B. FIG. 21B, FIG. 22B, and FIG. 23B each show a calculation result of an application state of an electric field in a liquid crystal display device. FIG. 19A, FIG. 20A, FIG. 21A, FIG. 22A, and FIG. 23A each show a structure of a liquid crystal display device used for calculation. For the calculation, LCD Master, 2s Bench manufactured by Shintec Company Limited is used, and an insulator with a dielectric constant of 4 is used as the structure bodies (the first structure body 233a, the second structure bodies 234a and 234b, and the third structure body). Moreover, in cross sections, the widths of the pixel electrode layer 230a, a pixel electrode layer 802, the first common electrode layers 231a and 231b, the second common electrode layers 232a and 232b, and common electrode layers 803a and 803b are each 4 µm, the thicknesses of them are each 0.5 µM, the thickness of the liquid crystal layer is 10 µm, and the distances, which are parallel to the substrate, between the following are each 6 µm between the pixel electrode layer 230a and the first common electrode layer 231a; between the pixel electrode layer 230a and the first common electrode layer 231b; between the pixel electrode layer 230a and the second common electrode layer 232a; between the pixel electrode layer 230a and the second common electrode layer 232b; between the pixel electrode layer 802 and the common electrode layer 803a; and between the pixel electrode layer 802 and the common electrode layer 803b. In addition, the voltages applied to the common electrode layers, the first common electrode layers, and the second common electrode layers are each 0V, and the voltage applied to the pixel electrode layers is 10 V.

Figure 21A:
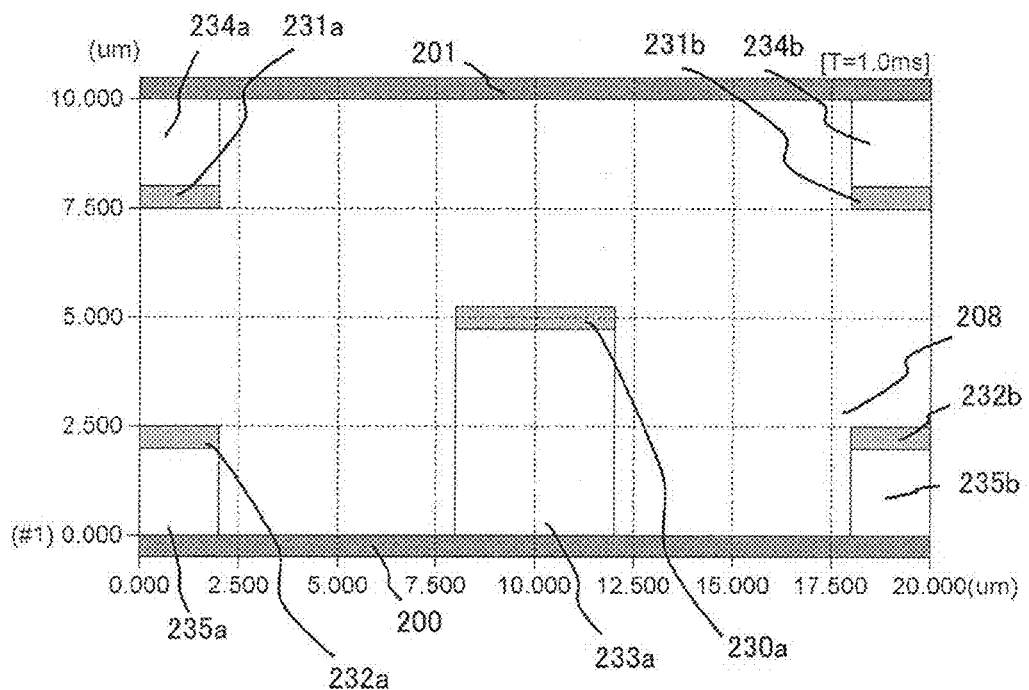
FIGS. 21A and 21B show calculation results of an electric field mode in a liquid crystal display device.
Figure 21B:
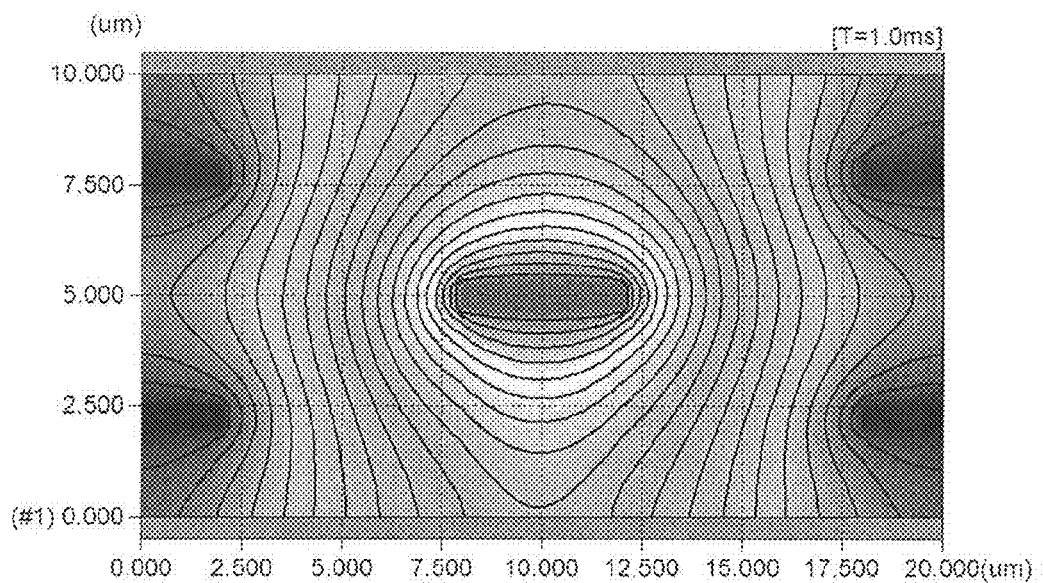
Figure 22A:
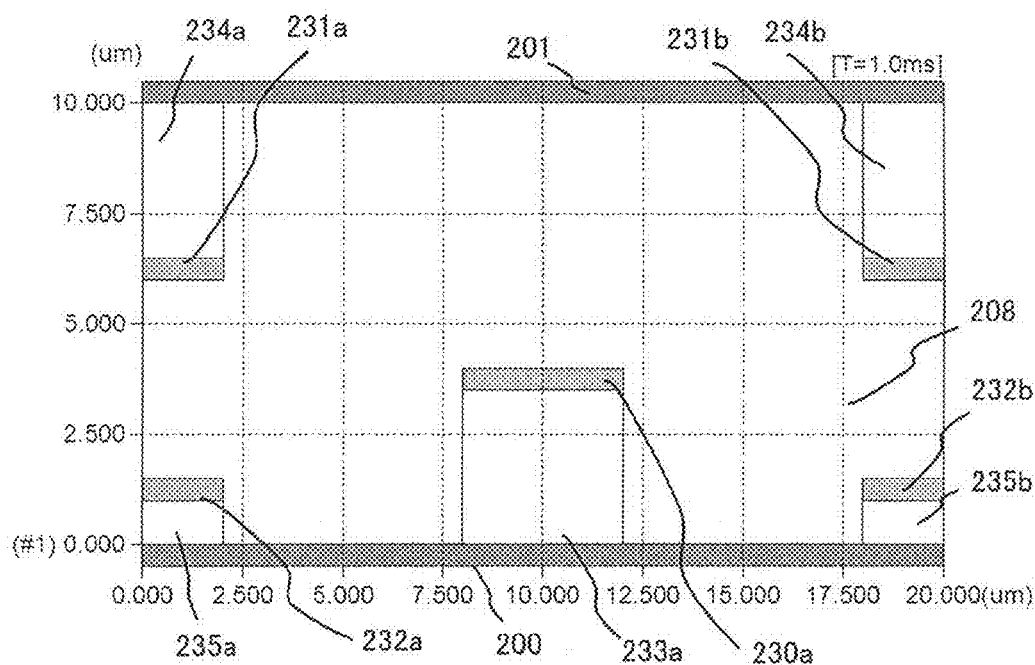
FIGS. 22A and 22B show calculation results of an electric field mode in a liquid crystal display device.
Figure 22B:
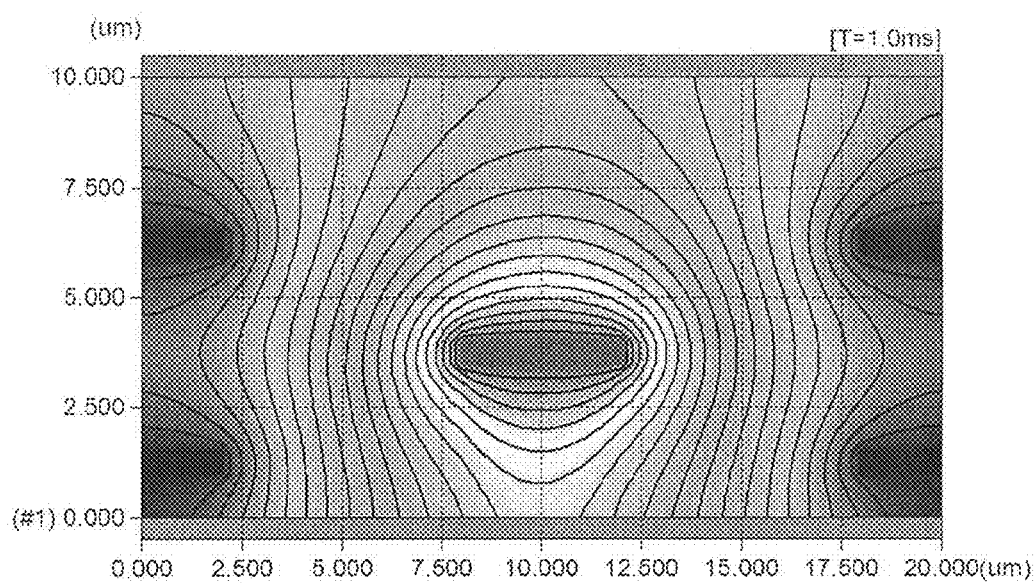
Figure 23A:
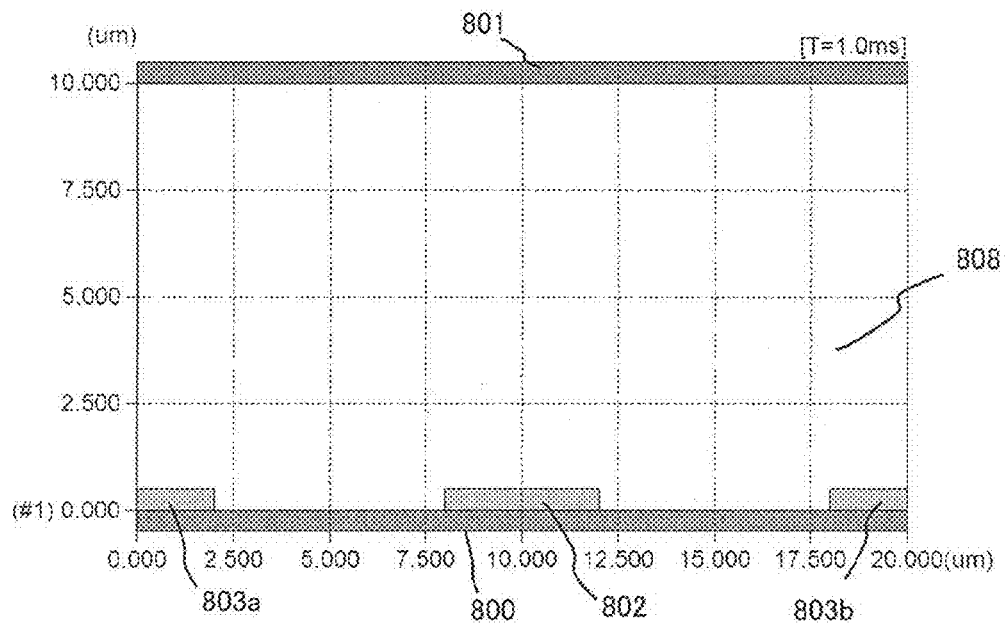
FIGS. 23A and 23B show calculation results of an electric field mode in a liquid crystal display device.
Figure 23B:
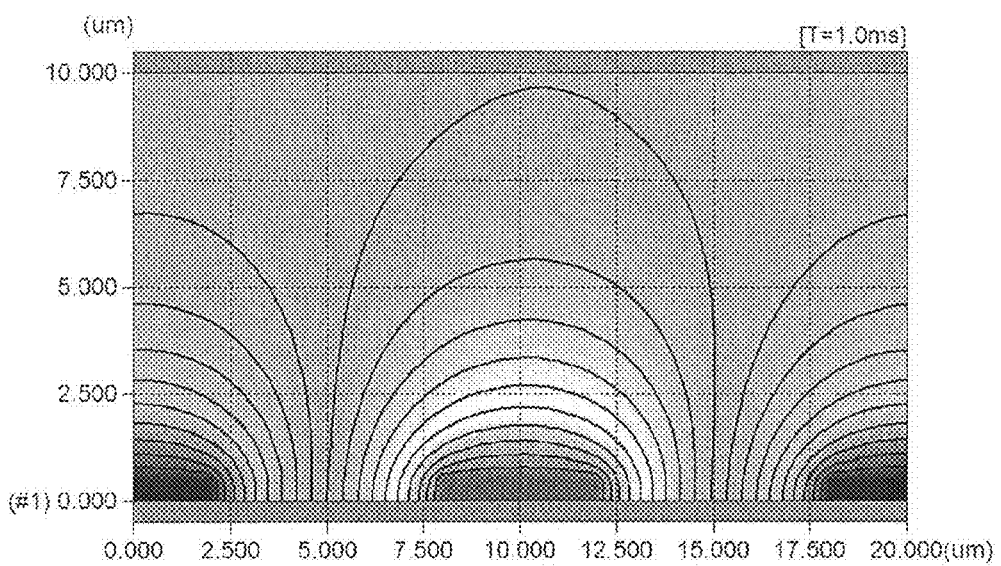

The calculation results shown in FIGS. 19A and 19B correspond to FIG. 1A, the calculation results shown in FIGS. 20A and 20B correspond to FIG. 1B, and the calculation results shown in FIGS. 21A and 21B and FIGS. 22A and 22B correspond to FIG. 1C. The heights (thicknesses) of the first structure body 233a and the second structure bodies 234a and 234b are each 3.75 µm. FIGS. 21A and 21B show an example in which the third structure bodies 235a and 235b and the second structure bodies 234a and 234b have the same thickness of 3.75 µm. In contrast, FIGS. 22A and 22B show an example in which, in FIG. 1C, the third structure bodies 235a and 235b each have a thickness of 1.75 µm, which is smaller than the thicknesses (3.75 µm) of the second structure bodies 234a and 234b. In addition, FIGS. 23A and 23B show a comparative example in which the common electrode layers 803a and 803b and the pixel electrode layer 802 are alternately provided between a first substrate 800 and a liquid crystal layer 808 and sealed with a second substrate 801. In FIG. 19B, FIG. 20B, FIG. 21B, FIG. 22B, and FIG. 23B, a solid line indicates an equipotential line, and the pixel electrode layer and the common electrode layers (the first common electrode layer and the second common electrode layer) are each positioned at the center of the equipotential line which spreads concentrically.

An electric field appears perpendicularly to the equipotential line; thus, it can be confirmed that an electric field is applied between the pixel electrode layer and the first common electrode layer in an oblique direction and an electric field is applied between the pixel electrode layer and the second common electrode layer in an oblique direction as shown in FIG. 19B, FIG. 20B, FIG. 21B, and FIG. 22B. In addition, as shown in FIG. 21B and FIG. 22B, even when the second structure bodies 234a and 234b and the third structure bodies 235a and 235b are provided under the first common electrode layers 231a and 231b and the second common electrode layers 232a and 232b, respectively, a potential line forms a circle. Thus, electric fields are formed in the entire liquid crystal layer.

On the other hand, in FIG. 23B, an equipotential line appears and an electric field is foamed in the liquid crystal layer in the proximity of the first substrate 800 over which the pixel electrode layer 802 and the common electrode layers 803a and 803b are alternately formed; however, a potential line is not distributed and potential difference is not generated as the potential line gets closer to the second substrate 801. Therefore, electric fields are not formed in the liquid crystal layer 808 in the proximity of the second substrate 801, and it can be confirmed that it is difficult to make all liquid crystal molecules in the liquid crystal layer respond when the structure in FIGS. 23A and 23B is employed.

The pixel electrode layer is provided over the structure body and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

The white transmittance in the liquid crystal display device is determined by the product of the birefringence of the liquid crystal, which is generated when voltage is applied, and the thickness of the liquid crystal layer; thus, even in the case where the liquid crystal layer is made thick, liquid crystal molecules in the entire liquid crystal layer can be made to respond.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance (light transmittance in black display) can also be increased.

The structure body can be formed using an insulator which uses an insulating material (an organic material and an inorganic material) and a conductor which uses a conductive material (an organic material and an inorganic material). Typically, a visible light curable resin, an ultraviolet curable resin, or a thermosetting resin is preferably used. For example, an acrylic resin, an epoxy resin, an amine resin, or the like can be used. Moreover, the structure body may be formed using a conductive resin or a metal material. Note that the structure body may have a stacked-layer structure of plural thin films. The structure body can have a columnar shape, a shape of a pyramid where the apex is made to be a plane so that the structure body has a trapezoidal shape in a cross-section, a dome shape where the tip is rounded, or the like. Furthermore, the structure body may be a portion which projects into the liquid crystal layer from a surface of the substrate on a liquid crystal layer side; thus, an interlayer film may be processed so that the surface on the liquid crystal layer side is uneven, whereby a projected structure body may be obtained. Accordingly, the structure body may be formed using a continuous film in which a plurality of projections is projected.

Figure 24A:
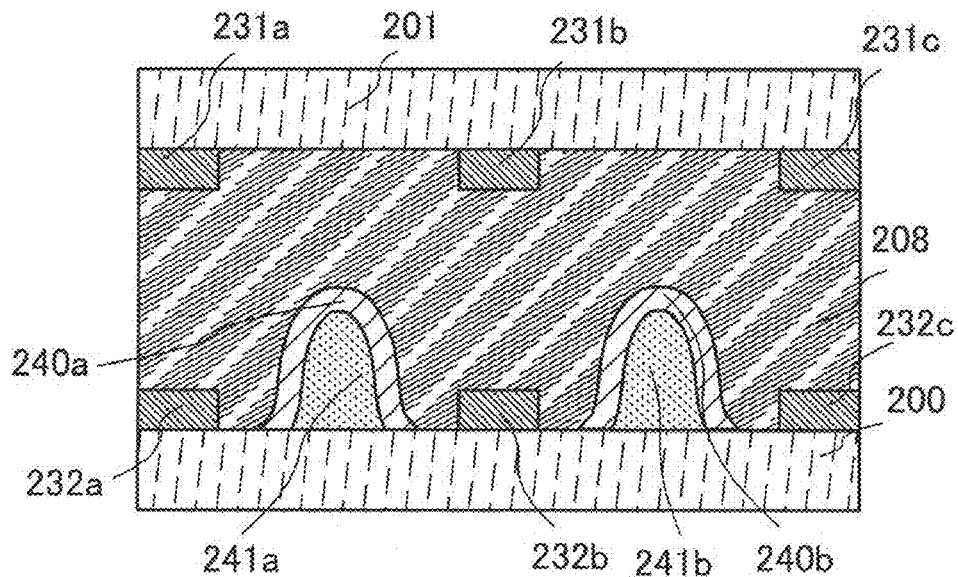
FIGS. 24A and 24B are cross-sectional views illustrating liquid crystal display devices.
Figure 24B:
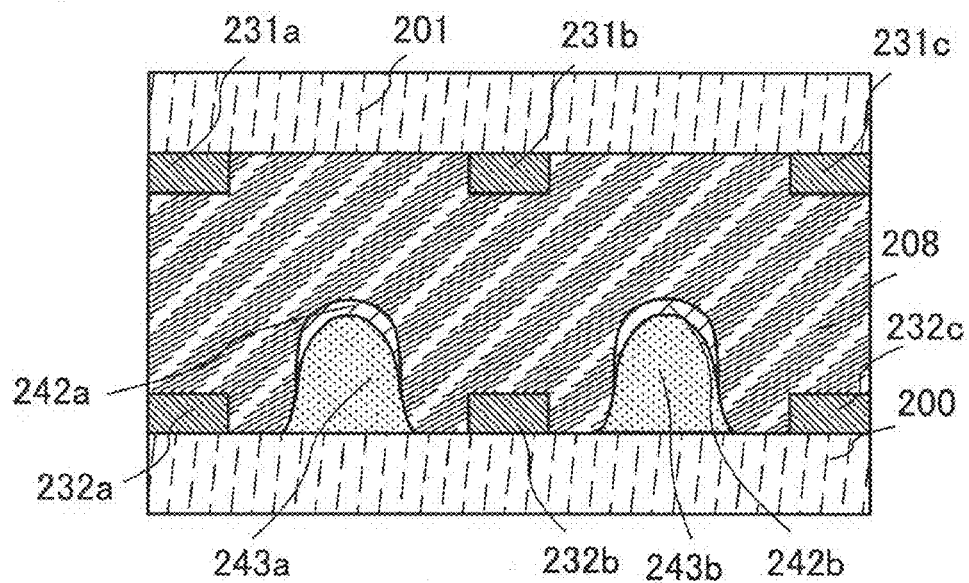

Note that shapes of the pixel electrode layer formed over the structure body, the first common electrode layer, and the second common electrode layer reflect the shape of the structure body and are also influenced by an etching process method. FIGS. 24A and 24B illustrate examples of shapes of structure bodies and pixel electrode layers formed over the structure bodies. Note that FIGS. 24A and 24B illustrate examples of the first structure bodies and the pixel electrode layers; however, similarly, the second structure bodies, the first common electrode layers, the third structure bodies, and the second common electrode layers can also have various shapes.

FIG. 24A illustrates an example in which pixel electrode layers 240a and 240b are formed over first structure bodies 241a and 241b, respectively, and FIG. 24B illustrates an example in which pixel electrode layers 242a and 242b are formed over first structure bodies 243a and 243b, respectively. The first structure bodies 241a, 241b, 243a, and 243b each have a dome shape where the tip is rounded. This is an example in which the pixel electrode layers 240a and 240b which are formed over the first structure bodies 241a and 241b, respectively, are formed so as to cover side surfaces of the first structure bodies 241a and 241b and are partly in contact with the first substrate 200. On the other hand, in this example, the pixel electrode layers 242a and 242b which are formed over the first structure bodies 243a and 243b, respectively, are formed only above side surfaces of the first structure bodies 243a and 243b. In such a manner, the pixel electrode layer may cover (all or part of) the side surface of the structure body, and the pixel electrode layer may have a non-uniform thickness and a thickness distribution. In also this case, the liquid crystal layer has a region where the pixel electrode layer is present between the first common electrode layer and the second common electrode layer, which has an effect of forming oblique electric fields between the pixel electrode layer and the first common electrode layer and between the pixel electrode layer and the second common electrode layer in the entire liquid crystal layer. Accordingly, the pixel electrode layer is positioned between the first common electrode layer and the second common electrode layer at the highest position of the pixel electrode layer (a top surface of the pixel electrode layer) at least in a thickness direction of the liquid crystal.

The liquid crystal layer 208 can be formed by a dispenser method (a dropping method), or an injecting method by which a liquid crystal is injected using a capillary phenomenon after the first substrate 200 is attached to the second substrate 201.

A blue phase liquid crystal material is used for the liquid crystal layer 208. The blue phase liquid crystal material has a short response time of 1 msec or less and is capable of high-speed response. Thus, a high performance liquid crystal display device can be achieved.

The blue phase liquid crystal material includes a liquid crystal and a chiral agent. The chiral agent is used to align a liquid crystal such that the liquid crystal forms a spiral structure and to realize a blue phase. For example, a liquid crystal material mixed with a chiral agent at 5 wt % or more may be used for the liquid crystal layer.

As the liquid crystal, a thermotropic liquid crystal, a low molecular liquid crystal, a high molecular liquid crystal, a ferroelectric liquid crystal, an anti-ferroelectric liquid crystal, or the like is used.

For the chiral agent, a material which has a high compatibility with a liquid crystal and has a strong twisting power is used. In addition, as a material, either an R-enantiomer or an S-enantiomer is favorable, and a racemic body in which an R-enantiomer and an S-enantiomer are mixed at a ratio of 50:50 is not used.

The above liquid crystal materials exhibit a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are found in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be conducted in order to expand the temperature range. The polymer stabilization treatment is conducted in such a manner that a liquid crystal material including a liquid crystal, a chiral agent, a photocurable resin, and a photopolymerization initiator is irradiated with light having a wavelength with which the photocurable resin and the photopolymerization initiator are reacted. Such polymer stabilization treatment may be conducted by light irradiation of a liquid crystal material exhibiting an isotropic phase or by light irradiation of a liquid crystal material exhibiting a blue phase under the control of the temperature. For example, the polymer stabilization treatment is conducted in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C., preferably +5° C. from the phase transition temperature between the blue phase and the isotropic phase. The phase transition temperature between a blue phase and an isotropic phase refers to a temperature in transition from a blue phase to an isotropic phase when temperature is raised or a temperature in transition from an isotropic phase to a blue phase when temperature is reduced. As an example of the polymer stabilization treatment, the following method can be employed: after heating a liquid crystal layer to exhibit an isotropic phase, the temperature of a liquid crystal layer is gradually reduced so that the phase changes to a blue phase, and then, irradiation with light is conducted while the temperature at which a blue phase is exhibited is kept. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (with an isotropic phase exhibited). Moreover, in the case where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is conducted by irradiation with light at a temperature within +10° C., preferably +5° C. from the phase transition temperature between the blue phase and the isotropic phase (with an isotropic phase exhibited), the response time can be made as short as 1 msec or less and thus high-speed response is possible.

The photocurable resin may be a monofunctional monomer such as acrylate or methacrylate, a multifunctional monomer such as diacrylate, triacrylate, dimethacrylate, or trimethacrylate, or a mixture of any of them. In addition, the photocurable resin may be a liquid type, a non-liquid type, or a mixture of them. For the photocurable resin, a resin to be cured by light with a wavelength with which a photopolymerization initiator to be used is reacted may be selected, and an ultraviolet curable resin can be typically used.

The photopolymerization initiator may be a radical polymerization initiator which generates a radical by light irradiation, an acid generator which generates acid, or a base generator which generate a base.

Specifically, as a liquid crystal material, a mixture of JC-1041XX (manufactured by Chisso Corporation) and 4-cyano-4'-pentylbiphenyl can be used. As a chiral agent, ZLI-4572 (manufactured by Merck KGaA) can be used. As a photocurable resin, 2-ethylhexyl acrylate, RM257 (manufactured by Merck KGaA), or trimethylolpropane triacrylate can be used. As a photopolymerization initiator, 2,2-dimethoxy-2-phenylacetophenone can be used.

Moreover, although not illustrated in FIGS. 1A to 1C, a polarizing plate and an optical film such as a retardation plate or an anti-reflection film are provided as appropriate. Light circularly polarized by a polarizing plate and a retardation plate may be used, for example. In addition, a backlight or the like can be used as a light source.

In the case where, in this specification, the liquid crystal display device is a transmissive liquid crystal display device in which display is performed by transmission of light (or a semi-transmissive liquid crystal display device), it is necessary to transmit light at least in a pixel region. Therefore, the first substrate, the second substrate, and thin films of an insulating film, a conductive film, and the like which are present in the pixel region through which light is transmitted all have a light-transmitting property of visible light.

It is preferable that the pixel electrode layer, the first common electrode layer, and the second common electrode layer each have a light-transmitting property; however, since an opening pattern is provided, a non-light-transmitting material such as a metal film may be used.

The pixel electrode layer, the first common electrode layer, and the second common electrode layer may be formed using any one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organic indium, organotin, indium oxide containing tungsten oxide, indium zinc oxide containing tungsten oxide, indium oxide containing titanium oxide, and indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

As the first substrate 200 and the second substrate 201, a glass substrate made of barium borosilicate glass, aluminoborosilicate glass, or the like, a quartz substrate, a plastic substrate, or the like can be used.

Through these steps, the contrast ratio of the liquid crystal display device using a blue phase liquid crystal layer can be increased.

(Embodiment 2)

The invention disclosed in this specification is applicable to either a passive matrix liquid crystal display device or an active matrix liquid crystal display device. An example of the active matrix liquid crystal display device is described with reference to FIGS. 2A and 2B, FIGS. 8A to 8D, and FIGS. 18A and 18B.

Figure 2A:
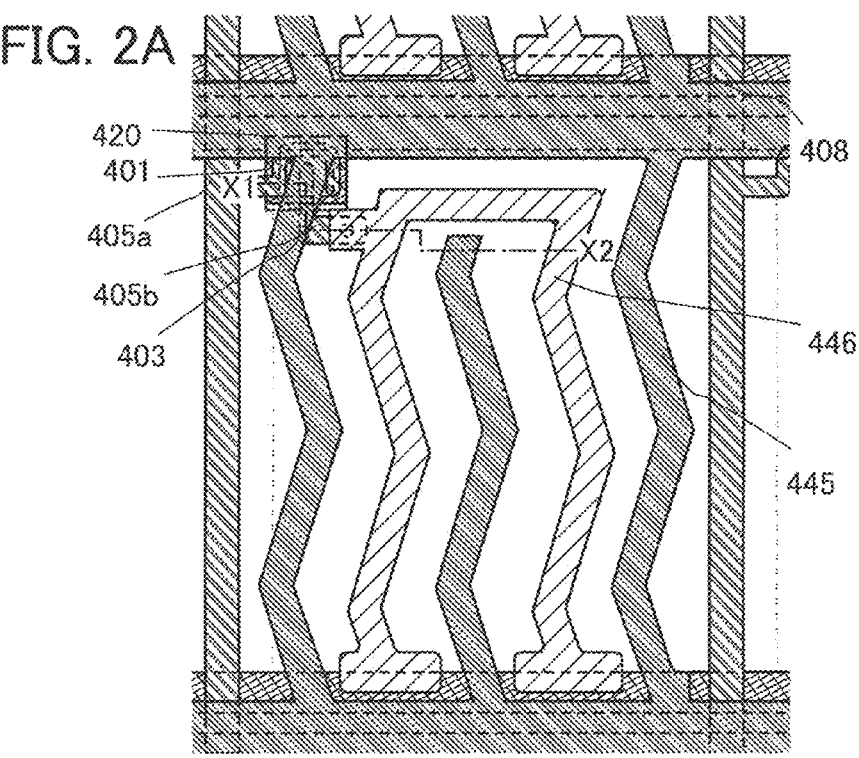
FIGS. 2A and 2B are views illustrating a liquid crystal display device.
Figure 2B:
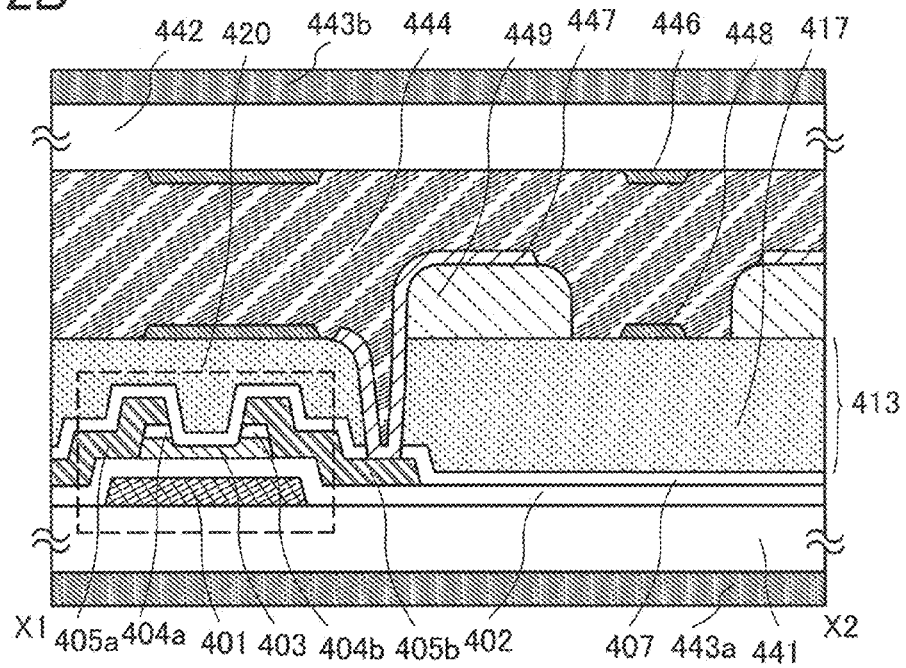

FIG. 2A is a plan view of a liquid crystal display device and illustrates one pixel. FIG. 2B is a cross-sectional view taken along the line X1-X2 in FIG. 2A.

In FIG. 2A, a plurality of source wiring layers (including a wiring layer 405a) is provided in parallel to each other (extended in a vertical direction in the drawing) and apart from each other. A plurality of gate wiring layers (including a gate electrode layer 401) is extended in a direction generally perpendicular to the source wiring layers (a horizontal direction in the drawing) and provided apart from each other. Capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with the pixel electrode layer, the first common electrode layer, and the second common electrode layer of a liquid crystal display device with a liquid crystal layer 444 interposed therebetween. A thin film transistor 420 for driving the pixel electrode layer is provided at an upper left corner of the drawing. The plurality of pixel electrode layers and thin film transistors are arranged in matrix.

In the liquid crystal display device illustrated in FIGS. 2A and 2B, a first electrode layer 447 which is electrically connected to the thin film transistor 420 functions as a pixel electrode layer, a second electrode layer 446 functions as a first common electrode layer, and a third electrode layer 448 functions as a second common electrode layer. Note that a capacitor is formed by the first electrode layer 447 and the capacitor wiring layer 408. Although the first common electrode layer and the second common electrode layer can operate in a floating state (an electrically isolated state), the potentials of the first common electrode layer and the second common electrode layer may be set to a fixed potential, preferably to a potential around a common potential (an intermediate potential of an image signal which is transmitted as data) in such a level as not to generate flickers. Note that it is preferable that the first common electrode layer and the second common electrode layer have the same potential.

The first electrode layer 447 which functions as a pixel electrode layer is formed over a first structure body 449 which is provided so as to project into the liquid crystal layer 444 from a surface of an interlayer film 413, which is formed over a first substrate 441 (also referred to as an element substrate), on a liquid crystal layer 444 side; and the first electrode layer 447 which functions as a pixel electrode layer is positioned between the second electrode layer 446 which functions as a first common electrode layer and the third electrode layer 448 which functions as a second common electrode layer in a thickness direction of the liquid crystal layer 444. In addition, in the cross-sectional views in FIGS. 2A and 213, the first electrode layer 447, and the second electrode layer 446 and the third electrode layer 448 are alternatively provided without overlapping each other. It is preferable that the second electrode layer 446 and the third electrode layer 448 have the same shape at least in a pixel region and be positioned so as to overlap each other with the liquid crystal layer 444 interposed therebetween so that the aperture ratio of a pixel is not reduced.

The first electrode layer 447, the second electrode layer 446, and the third electrode layer 448 have various opening patterns and have a shape including a bend portion and a comb shape which branches out, instead of a flat shape.

If the first electrode layer 447 is positioned between the second electrode layer 446 and the third electrode layer 448, as described in Embodiment 1, both the second electrode layer 446 and the third electrode layer 448 may be formed over the structure bodies which are provided so as to project into the liquid crystal layer.

In the second electrode layer 446 and third electrode layer 448 which are formed so as to sandwich a liquid crystal therebetween, and the first electrode layer 447, three of which are each provided with an opening pattern, electric fields are applied between the first electrode layer 447 and the second electrode layer 446 and between the first electrode layer 447 and the third electrode layer 448, so that the electric fields are applied to the liquid crystal layer 444 in an oblique direction (a direction oblique to the substrate). Thus, liquid crystal molecules can be controlled by using the electric fields. In addition, the electric field between the first electrode layer 447 and the second electrode layer 446 and the electric field between the first electrode layer 447 and the third electrode layer 448 can be applied to the liquid crystal because the first electrode layer 447 is positioned between the second electrode layer 446 and the third electrode layer 448 in a thickness direction of the liquid crystal layer 444. Thus, electric fields can be formed in the entire liquid crystal layer 444.

Therefore, liquid crystal molecules in the entire liquid crystal layer, which also includes the liquid crystal molecules in a thickness direction, can be made to respond due to the oblique electric fields formed in the entire liquid crystal layer 444 and white transmittance can be improved. Accordingly, the contrast ratio which is a ratio of white transmittance to black transmittance (light transmittance in black display) can also be increased.

The structure body can be formed using an insulator which uses an insulating material (an organic material and an inorganic material) and a conductor which uses a conductive material (an organic material and an inorganic material). Typically, a visible light curable resin, an ultraviolet curable resin, or a thermosetting resin is preferably used. For example, an acrylic resin, an epoxy resin, an amine resin, or the like can be used. Moreover, the structure body may be formed using a conductive resin or a metal material. Note that the structure body may have a stacked-layer structure of plural thin films. The structure body can have a columnar shape, a shape of a pyramid where the apex is made to be a plane so that the structure body has a trapezoidal shape in a cross-section, a dome shape where the tip is rounded, or the like. Furthermore, the structure body may be a portion which projects into the liquid crystal layer from a surface of the substrate on a liquid crystal layer side; thus, an interlayer film may be processed so that the surface on the liquid crystal layer side is uneven, whereby a projected structure body may be obtained. Accordingly, the structure body may be formed using a continuous film in which a plurality of projections is projected.

The method for forming the structure body is not particularly limited, and a dry method such as evaporation, sputtering, or CVD or a wet method such as spin coating, dip coating, spray coating, droplet discharging (ink jetting), nanoimprinting, or various printing methods (screen printing or offset printing) may be used in accordance with the material. As needed, an etching method (dry etching or wet etching) may be employed to form a desired pattern.

It is preferable that the first structure body 449 which is provided with the first electrode layer 447 have a tapered shape in which end portions have curvatures as illustrated in FIG. 2B because coverage of the first electrode layer 447 is improved. This embodiment describes an example in which the first electrode layer 447 is successively formed up to a top surface of the first structure body 449 and in contact with a wiring layer 405b of the thin film transistor 420; however, the first electrode layer 447 may be formed with an electrode layer which is formed in contact with the wiring layer 405b interposed between the first electrode layer 447 and the wiring layer 405b.

In addition, in the case where an interlayer film is formed so as to cover a thin film transistor and a structure body is formed over the interlayer film, after the structure body is formed by etching process, a contact hole for connecting the interlayer film to the thin film transistor may be opened. Note that FIGS. 2A and 2B illustrate an example in which after a contact hole is formed in an insulating film which functions as the interlayer film and an insulating film which is to be a structure body, the insulating film is processed by etching so that the structure body is formed.

Figure 8A:
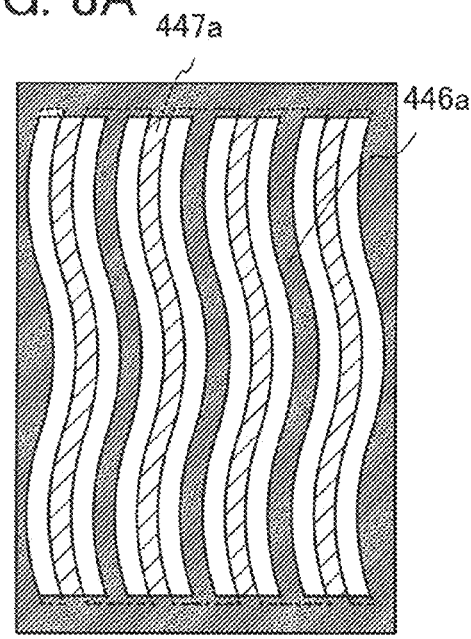
FIGS. 8A to 8D are top views illustrating electrode layers of liquid crystal display devices.
Figure 8B:
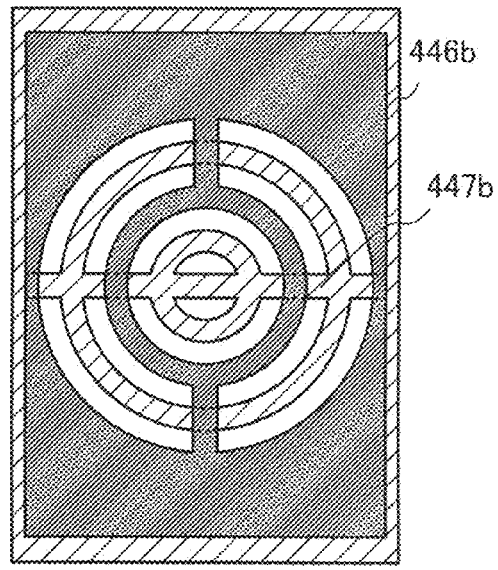
Figure 8C:
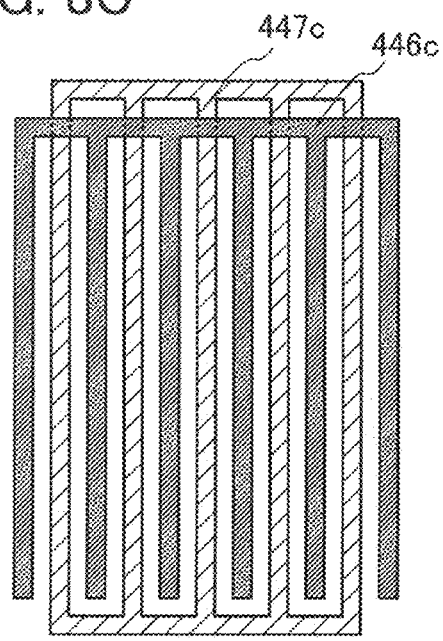
Figure 8D:
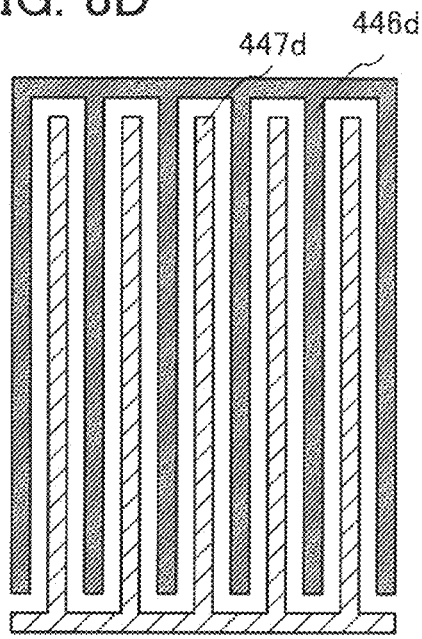

FIGS. 8A to 8D illustrate another example of the first electrode layer 447, the second electrode layer 446, and the third electrode layer 448. Although omitted in FIGS. 8A to 8D, the liquid crystal layer 444 is sandwiched between the first electrode layer 447 and the second electrode layer 446, and the third electrode layer 448 which functions as a second common electrode layer is positioned to face the second electrode layer 446 which functions as a first common electrode layer. As illustrated in top views of FIGS. 8A to 8D, first electrode layers 447a, 447b, 447c, and 447d and second electrode layers 446a, 446b, 446c, and 446d are alternately formed. In FIG. 8A, the first electrode layer 447a and the second electrode layer 446a each have a wavelike shape with curves. In FIG. 8B, the first electrode layer 447b and the second electrode layer 446b each have a concentric opening. In FIG. 5C, the first electrode layer 447c and the second electrode layer 446c each have a comb-shape and partly overlap each other. In FIG. 8D, the first electrode layer 447d and the second electrode layer 446d each have a comb-shape in which the electrode layers are engaged with each other.

Note that in the case where the first electrode layers 447a, 447b, and 447c overlap third electrode layers 448a, 448b, and 448c, respectively, as illustrated in FIGS. 8A to 8C, an insulating film is formed between the first electrode layer 447 and the third electrode layer 448, and the first electrode layer 447 and the third electrode layer 448 are each formed over different films.

Figure 18A:
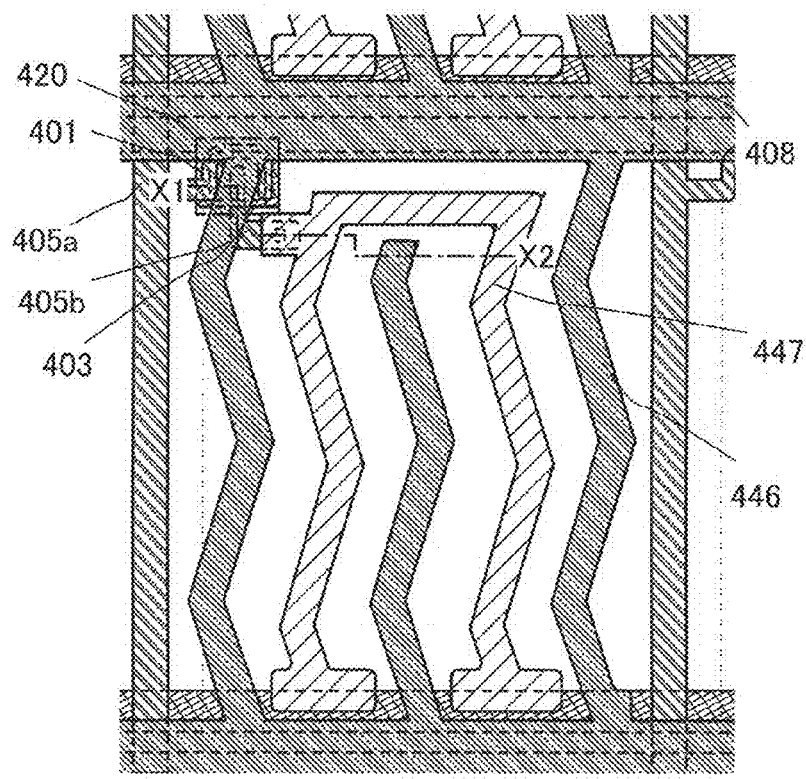
FIGS. 18A and 18B are views illustrating a liquid crystal display device.
Figure 18B:
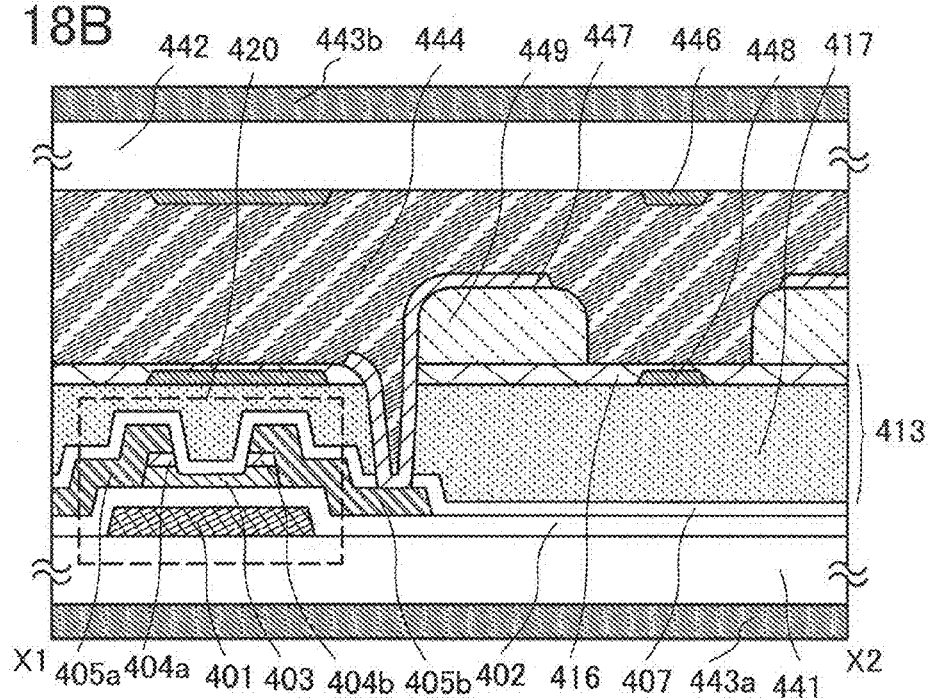

In the liquid crystal display device illustrated in FIGS. 18A and 18B, the first electrode layer 447 which functions as a pixel electrode layer and the third electrode layer 448 which functions as a second common electrode layer are each provided over different films (different layers), as illustrated in a cross-sectional view of FIG. 18B.

In FIGS. 18A and 18B, the third electrode layer 448 which functions as a second common electrode layer is formed over the interlayer film 413, an insulating film 416 is stacked over the third electrode layer 448, and the first electrode layer 447 which functions as a pixel electrode layer is formed over the insulating film 416. Note that in FIGS. 18A and 18B, a capacitor is formed by the first electrode layer and a common wiring layer.

The thin film transistor 420 is an inverted staggered thin film transistor in which the gate electrode layer 401, a gate insulating layer 402, a semiconductor layer 403, $n^+$ layers 404a and 404b which function as a source region and a drain region, and wiring layers 405a and 405b which function as a source electrode layer and a drain electrode layer are formed over the first substrate 441 which has an insulating surface. The $n^+$ layers 404a and 404b have lower resistance than the semiconductor layer 403.

An insulating film 407 which covers the thin film transistor 420 and is in contact with the semiconductor layer 403 is provided. The interlayer film 413 is provided over the insulating film 407, the first electrode layer 447 is formed over the interlayer film 413, and the second electrode layer 446 is formed with the liquid crystal layer 444 interposed between the second electrode layer 446 and the interlayer film 413.

The liquid crystal display device can be provided with a coloring layer which functions as a color filter layer. The color filter layer may be provided on an outer side of the first substrate 441 or/and a second substrate 442 (on a side opposite to the liquid crystal layer 444) or on an inner side of the first substrate 441 or/and the second substrate 442.

A color filter may be formed using materials which exhibit red (R), green (G), and blue (B) in the case where the liquid crystal display device is a full-color display; and the coloring layer may be omitted or may be formed using a material which exhibits at least one color in the case where the liquid crystal display device is a monochrome display. Note that the color filter is not always provided in the ease where light emitting diodes (LEDs) of RGB or the like are arranged in a backlight unit and a successive additive color mixing method (a field sequential method) in which color display is performed by time division is employed.

FIGS. 2A and 2B illustrate an example of a liquid crystal display device in which a chromatic-color light-transmitting resin layer 417 which functions as a color filter layer is used as the interlayer film 413.

In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can function as both the interlayer film and the color filter layer, whereby the process can be simplified and a liquid crystal display device can be manufactured at lower cost.

As the chromatic color light-transmitting resin, a photosensitive organic resin or a non-photosensitive organic resin can be used. The photosensitive organic resin is preferably used because the number of resist masks can be reduced; thus, the process can be simplified. In addition, a shape of a contact hole which is formed in the interlayer film is also an opening shape with a curvature; thus, coverage of films such as an electrode layer formed in the contact hole can also be improved.

Chromatic colors are colors except achromatic colors such as black, gray, and white. In order to function as a color filter, the coloring layer is formed using a material which transmits only the chromatic color light. As the chromatic color, red, green, blue, or the like can be used. Alternatively, cyan, magenta, yellow, or the like may be used. "Transmitting only the chromatic color light" means that light transmitted through the coloring layer has a peak at the wavelength of the chromatic color light.

The optimal thickness of the chromatic-color light-transmitting resin layer 417 is preferably controlled as appropriate in order that the chromatic-color light-transmitting resin layer 417 may function as a coloring layer (color filter) in consideration of the relation between the concentration of the coloring material to be included and transmittance of light. In the case where the interlayer film 413 is formed by stacking a plurality of thin films and at least one layer of them is a chromatic-color light-transmitting resin layer, it can be made to function as a color filter.

In the case where the thickness of the chromatic-color light-transmitting resin layer varies depending on the color of the chromatic color or in the case where there is surface unevenness due to a light-blocking layer or a thin film transistor, an insulating layer which transmits light in a visible wavelength range (a so-called colorless and transparent insulating layer) may be stacked for planarization of a surface of the interlayer film. The planarization of the interlayer film enables favorable coverage by a pixel electrode layer or a second common electrode layer to be formed thereover and uniform gap (thickness) of a liquid crystal layer, whereby the visibility of the liquid crystal display device is increased and higher image quality can be achieved.

The method for forming the interlayer film 413 (the chromatic-color light-transmitting resin layer 417) is not particularly limited, and the following method can be employed in accordance with the material: spin coating, dip coating, spray coating, droplet discharging (for example, ink jetting, screen printing, or offset printing), doctor knifing, roll coating, curtain coating, knife coating, or the like.

The liquid crystal layer 444 is provided over the first electrode layer 447 and the third electrode layer 448 and sealed with the second substrate 442 which functions as a counter substrate on which the second electrode layer 446 is formed.

The first substrate 441 and the second substrate 442 are light-transmitting substrates and provided with polarizing plates 443a and 443b on outer sides (on the sides opposite to the liquid crystal layer 444), respectively.

The process for manufacturing the liquid crystal display device illustrated in FIGS. 2A and 2B is described with reference to FIGS. 7A to 7D. FIGS. 7A to 7D are cross-sectional views of the process for manufacturing a liquid crystal display device. Note that a pixel electrode layer, a first common electrode layer, and a second common electrode layer which are included are omitted in FIGS. 7A to 7D. The pixel electrode layer, the first common electrode layer, and the second common electrode layer can have structures illustrated in FIGS. 2A and 2B, and an oblique electric field mode which is generated in such a manner that the pixel electrode layer formed over the structure body is positioned between the first common electrode layer and the second common electrode layer in the liquid crystal layer can be employed.

Figure 7A:
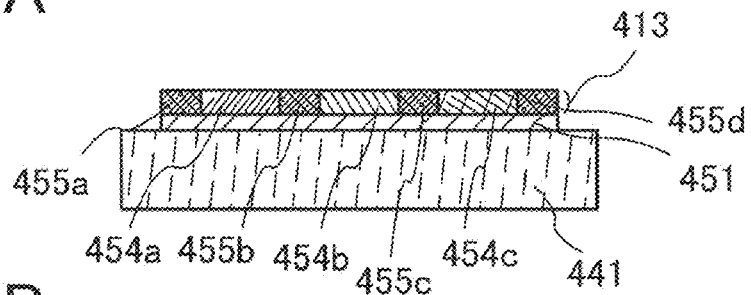
FIGS. 7A to 7D are cross-sectional views illustrating a method for manufacturing a liquid crystal display device.

In FIG. 7A, an element layer 451 is formed over the first substrate 441 which functions as an element substrate, and the interlayer film 413 is formed over the element layer 451.

The interlayer film 413 includes chromatic-color light-transmitting resin layers 454a, 454b, and 454c and light-blocking layers 455a, 455b, 455c, and 455d and has a structure in which the chromatic-color light-transmitting resin layers 454a, 454b, and 454c are formed between the light-blocking layers 455a and 455b, between the light-blocking layers 455b and 455c, and between the light-blocking layers 455c and 455d, respectively. Note that in FIGS. 7A to 7D, the pixel electrode layer, the first common electrode layer, and the second electrode layer which are included are omitted.

Figure 7B:
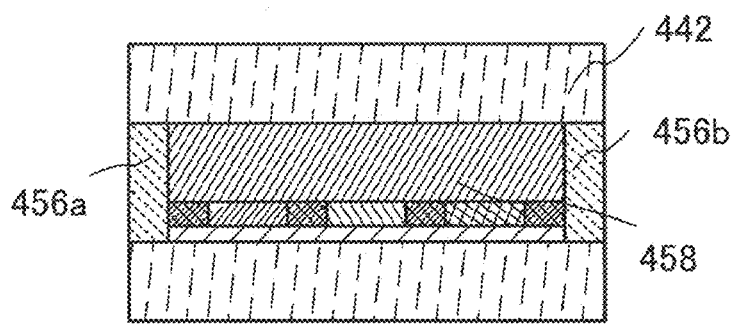

As illustrated in FIG. 7B, the first substrate 441 and the second substrate 442 which functions as a counter substrate are firmly attached to each other with sealants 456a and 456b with a liquid crystal layer 458 interposed therebetween. The liquid crystal layer 458 can be formed by a dispenser method (a dropping method), or an injecting method by which a liquid crystal is injected using a capillary phenomenon after the first substrate 441 is attached to the second substrate 442.

A blue phase liquid crystal material can be used for the liquid crystal layer 458. The liquid crystal layer 458 is formed using a liquid crystal material including a liquid crystal, a chiral agent, a photocurable resin, and a photopolymerization initiator.

Typically, a visible light curable resin, an ultraviolet curable resin, or a thermosetting resin is preferably used as the sealants 456a and 456b. An acrylic resin, an epoxy resin, an amine resin, or the like can be typically used. In addition, the sealants 456a and 456b may include a photopolymerization initiator (typically, an ultraviolet polymerization initiator), a thermosetting agent, a filler, and a coupling agent.

Figure 7C:
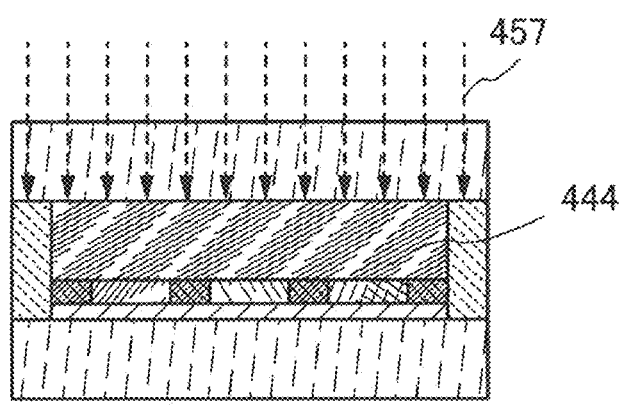

As illustrated in FIG. 7C, polymer stabilization treatment is conducted by irradiating the liquid crystal layer 458 with light 457 so that the liquid crystal layer 444 is formed. The light 457 is light having a wavelength with which the photocurable resin and the photopolymerization initiator included in the liquid crystal layer 458 are reacted. By such polymer stabilization treatment using light irradiation, the temperature range where the liquid crystal layer 444 exhibits a blue phase can be increased.

In the case where, for example, a photocurable resin such as an ultraviolet curable resin is used for a sealant and a liquid crystal layer is formed by a dropping method, the sealant may be cured in the light irradiation step for the polymer stabilization treatment.

As illustrated in FIGS. 7A to 7D, when the liquid crystal display device has a structure in which the color filter layer and the light-blocking layer are formed over the element substrate, the entire liquid crystal layer can be uniformly irradiated with light because light from a counter substrate side is not absorbed and not blocked by the color filter layer and the light-blocking layer. Therefore, alignment disorder of a liquid crystal due to nonuniform photopolymerization, display unevenness due to the alignment disorder, and the like can be prevented. In addition, the thin film transistor can also block light with the light-blocking layer so that defects of electrical characteristics due to the light irradiation can be prevented.

Figure 7D:
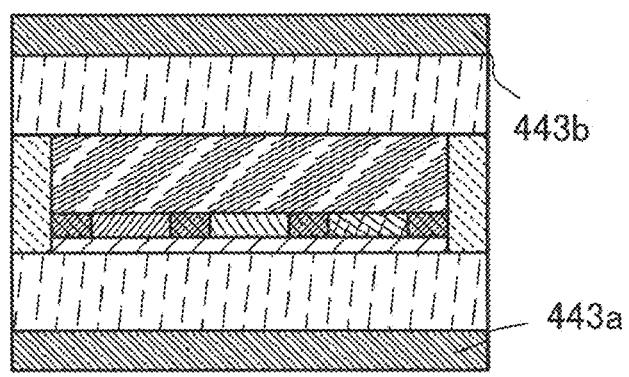

As illustrated in FIG. 7D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the second substrate 442. In addition to the polarizing plates, an optical film such as a retardation plate or an anti-reflection film may be provided. Light circularly polarized by a polarizing plate and a retardation plate may be used, for example. Through these steps, the liquid crystal display device can be completed.

In addition, in the case of manufacturing a plurality of liquid crystal display devices using a large-sized substrate (a so-called multiple panel method), a division step can be conducted before the polymer stabilization treatment or before provision of the polarizing plates. In consideration of the influence of the division step on the liquid crystal layer (such as alignment disorder due to force applied in the division step), it is preferable that the division step be conducted after the first substrate is attached to the second substrate and before the polymer stabilization treatment is conducted.

Although not illustrated, a backlight, a sidelight, or the like may be used as a light source. Light from the light source is emitted from a side of the first substrate 441 which functions as an element substrate, so as to pass through the second substrate 442 on a viewing side.

The first electrode layer 447, the second electrode layer 446, and the third electrode layer 448 can be formed using a light-transmitting conductive material such as indium oxide including tungsten oxide, indium zinc oxide including tungsten oxide, indium oxide including titanium oxide, indium tin oxide including titanium oxide, indium tin oxide (hereinafter referred to as ITO), indium zinc oxide, or indium tin oxide to which silicon oxide is added.

The first electrode layer 447, the second electrode layer 446, and the third electrode layer 448 may be formed using any one or more of the following: a metal such as tungsten (W), molybdenum (Mo), zirconium (Zr), hafnium (Hp, vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

The first electrode layer 447, the second electrode layer 446, and the third electrode layer 448 can be formed using a conductive composition including a conductive macromolecule (also referred to as a conductive polymer). It is preferable that a pixel electrode formed using a conductive composition have a sheet resistance of 10000 Ω/square or less and a light transmittance of 70% or more at a wavelength of 550 nm. It is also preferable that a conductive macromolecule which is included in the conductive composition have a resistivity of 0.1 Ω·cm or less.

As the conductive macromolecule, a so-called π-electron conjugated conductive macromolecule can be used. Examples of the conductive macromolecule include polyaniline and its derivatives, polypyrrole and its derivatives, polythiophene and its derivatives, copolymers of two or more kinds of them, and the like.

An insulating film which functions as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film. The gate electrode layer 401 can be formed to have a single-layer structure or a stacked-layer structure using a metal material such as molybdenum, titanium, chromium, tantalum, tungsten, aluminum, copper, neodymium, or scandium, or an alloy material which includes any of these materials as its main component. By using a light-blocking conductive film as the gate electrode layer 401, light from a backlight (light emitted through the first substrate 441) can be prevented from entering the semiconductor layer 403.

As a two-layer stacked structure of the gate electrode layer 401, for example, a two-layer stacked structure in which a molybdenum layer is stacked over an aluminum layer, a two-layer stacked structure in which a molybdenum layer is stacked over a copper layer, a two-layer stacked structure in which a titanium nitride layer or a tantalum nitride layer is stacked over a copper layer, or a two-layer stacked structure in which a titanium nitride layer and a molybdenum layer are stacked is preferable. As a three-layer stacked structure, a three-layer stacked structure in which a tungsten layer or a tungsten nitride layer, an alloy of aluminum and silicon or an alloy of aluminum and titanium, and a titanium nitride layer or a titanium layer are stacked is preferable.

The gate insulating layer 402 can be formed using a silicon oxide layer, a silicon nitride layer, a silicon oxynitride layer, or a silicon nitride oxide layer to have a single-layer structure or a stacked-layer structure by a plasma CVD method, a sputtering method, or the like. Alternatively, the gate insulating layer 402 can be formed using a silicon oxide layer by a CVD method in which an organosilane gas is used. As the organosilane gas, the following compound containing silicon can be used: tetraethyl orthosilicate tetraethoxysilane (TEOS, chemical formula: $Si(OC_2H_5)_4$), tetramethylsilane (TMS, chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), trisdimethylaminosilane ($SiH(N(CH_3)_2)_3$), or the like.

In steps for forming the semiconductor layer, the $n^+$ layer, and the wiring layer, an etching step is used to process thin films into desired shapes. Dry etching or wet etching can be used for the etching step.

As an etching apparatus used for the dry etching, an etching apparatus using a reactive ion etching method (an RIE method), or a dry etching apparatus using a high-density plasma source such as electron cyclotron resonance (ECR) or inductively coupled plasma (ICP) can be used. As such a dry etching apparatus with which uniform discharge can be easily obtained over a large area as compared to an ICP etching apparatus, there is an enhanced capacitively coupled plasma (ECCP) mode etching apparatus in which an upper electrode is grounded, a high-frequency power source of 13.56 MHz is connected to a lower electrode, and further a low-frequency power source of 3.2 MHz is connected to the lower electrode. This ECCP mode etching apparatus can be employed even when a substrate having the size exceeding 3 meters of the tenth generation is used as the substrate, for example.

In order to etch the films into desired shapes, etching conditions (for example, the amount of electric power applied to a coiled electrode, the amount of electric power applied to an electrode on a substrate side, and the electrode temperature on the substrate side) are controlled as appropriate.

In order to etch the films into desired shapes, etching conditions (for example, etchant, etching time, and temperature) are controlled as appropriate in accordance with the material.

As a material of the wiring layers 405a and 405b, an element selected from Al, Cr, Ta, Ti, Mo, and W, an alloy containing any of these elements as its component, an alloy containing any of these elements in combination, and the like can be given. If heat treatment is conducted, it is preferable that the conductive film have heat resistance enough to withstand the heat treatment. For example, since the use of Al alone brings disadvantages such as low heat resistance and a tendency to corrosion, aluminum is used in combination with a conductive material having heat resistance. As the conductive material having heat resistance which is combined with aluminum (Al), an element selected from titanium (Ti), tantalum (Ta), tungsten (W), molybdenum (Mo), chromium (Cr), neodymium (Nd), and scandium (Sc), an alloy containing any of these elements as its component, an alloy containing any of these elements in combination, or a nitride containing any of these elements as its component is used.

The gate insulating layer 402, the semiconductor layer 403, the n+ layers 404a and 404b, and the wiring layers 405a and 405b may be successively formed without being exposed to air. By successive formation without exposure to air, each interface between the stacked layers can be formed without being contaminated by atmospheric components or contaminating impurities contained in air; thus, variation in characteristics of the thin film transistor can be reduced.

Note that the semiconductor layer 403 is partly etched and has a groove (a depressed portion).

As the insulating film 407 which covers the thin film transistor 420, an inorganic insulating film or an organic insulating film which is formed by a dry method or a wet method can be used. A silicon nitride film, a silicon oxide film, a silicon oxynitride film, an aluminum oxide film, a tantalum oxide film, or the like, which is formed by a CVD method, a sputtering method, or the like, can be used, for example. In addition, an organic material such as polyimide, acrylic, benzocyclobutene, polyamide, or epoxy can be used. Other than such organic materials, it is also possible to use a low-dielectric constant material (a low-k material), a siloxane-based resin, phosphosilicate glass (PSG), borophosphosilicate glass (BPSG), or the like.

Note that the siloxane-based resin is a resin including a Si—O—Si bond, which is formed using a siloxane-based material as a starting material. The siloxane-based resin may include, as a substituent, an organic group (for example, an alkyl group or an aryl group) or a fluoro group. The organic group may include a fluoro group. A siloxane-based resin is applied by a coating method and baked; thus, the insulating film 407 can be formed.

Alternatively, the insulating film 407 may be formed by stacking plural insulating films formed using any of these materials. For example, the insulating film 407 may have such a structure that an organic resin film is stacked over an inorganic insulating film.

Further, with the use of a resist mask having a plurality of regions with different thicknesses (typically, two kinds of thicknesses), which is formed using a multi-tone mask, the number of resist masks can be reduced, resulting in a simplified process and lower cost.

Through these steps, the contrast ratio of the liquid crystal display device using a blue phase liquid crystal layer can be increased.

(Embodiment 3)

Figure 4A:
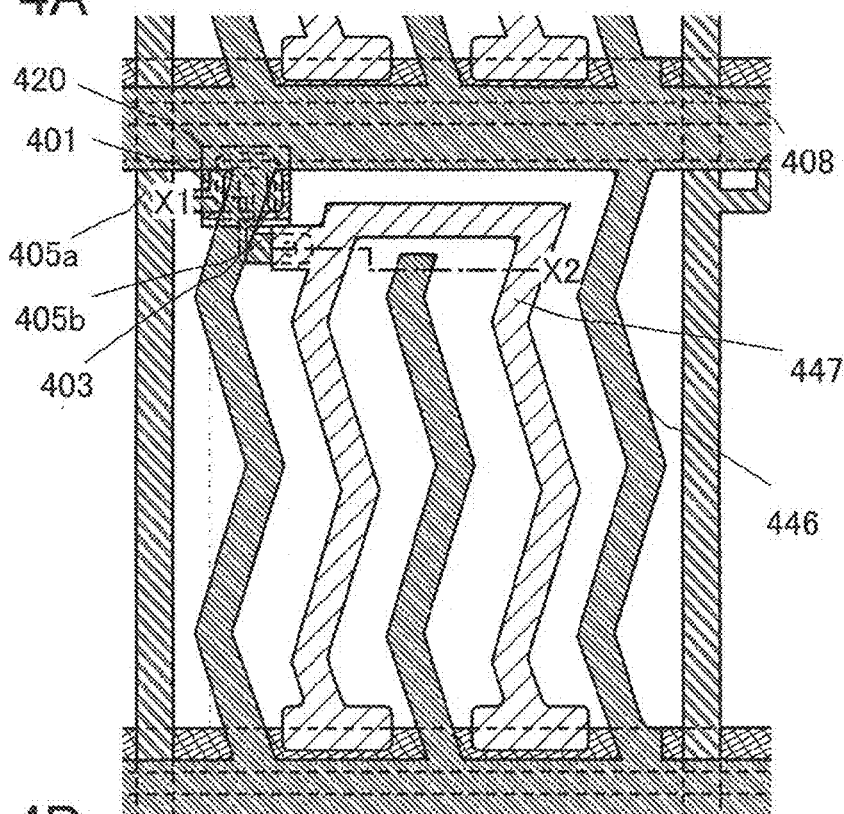
FIGS. 4A and 4B are views illustrating a liquid crystal display device.
Figure 4B:
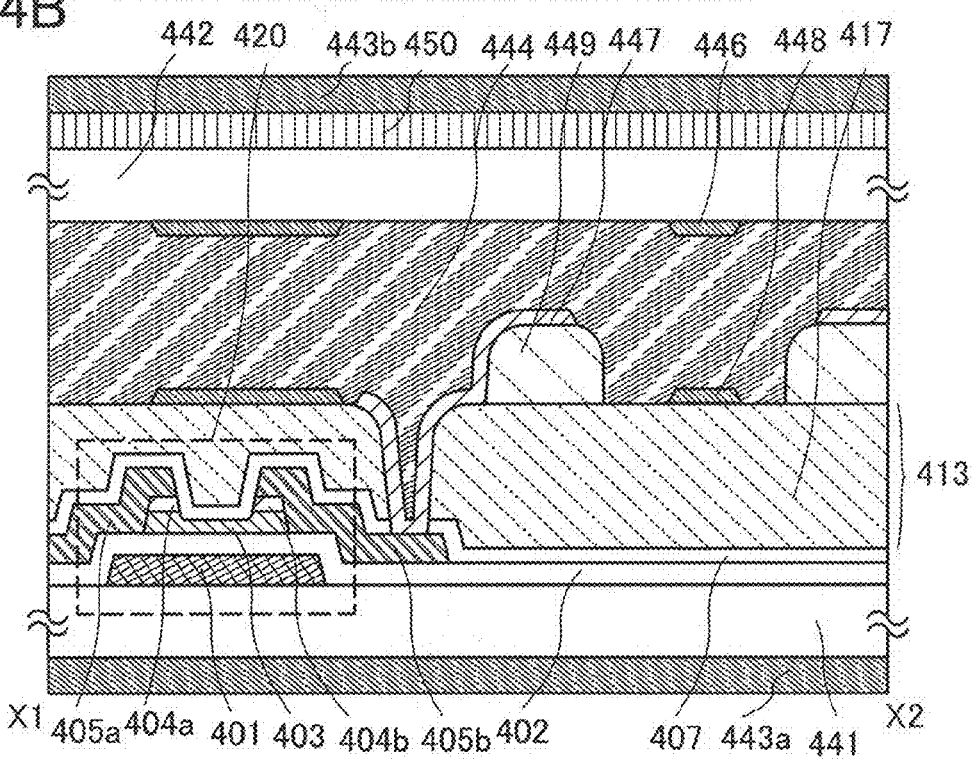

FIGS. 4A and 4B illustrate an example in which a color filter is provided on an outer side of substrates between which a liquid crystal layer is sandwiched in Embodiment 2. Note that components in common with those in Embodiments 1 and 2 can be formed using a similar material and manufacturing method, and detailed description of the same portions and portions having similar functions is omitted.

FIG. 4A is a plan view of a liquid crystal display device and illustrates one pixel. FIG. 4B is a cross-sectional view taken along the line X1-X2 in FIG. 4A.

In the plan view of FIG. 4A, in a manner similar to Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is provided apart from each other and extended in a direction generally perpendicular to the source wiring layers (a horizontal direction in the drawing). The capacitor wiring layers 408 are adjacent to the plurality of gate wiring layers and extended in a direction generally parallel to the gate wiring layers, that is, in a direction generally perpendicular to the source wiring layers (a horizontal direction in the drawing). A space with a generally rectangular shape, which is surrounded by the source wiring layers, the capacitor wiring layers 408, and the gate wiring layers, is provided with the pixel electrode layer, the first common electrode layer, and the second common electrode layer of a liquid crystal display device so that the liquid crystal layer 444 is interposed between the pixel electrode layer and the second common electrode layer, and the first common electrode layer. The thin film transistor 420 for driving the pixel electrode layer is provided at an upper left corner of the drawing. The plurality of pixel electrode layers and thin film transistors are arranged in matrix.

FIGS. 4A and 4B illustrate an example in which the interlayer film 413 is formed so as to cover the thin film transistor 420 and the first structure body 449 is formed over the interlayer film 413 by etching process, and then a contact hole through which the first electrode layer 447 to be formed later is connected to the thin film transistor 420 is opened in the interlayer film 413. The first electrode layer 447 which functions as a pixel electrode layer is successively formed so as to cover the first structure body 449 and the contact hole formed in the interlayer film 413.

In the liquid crystal display device illustrated in FIGS. 4A and 4B, a color filter 450 is provided between the second substrate 442 and the polarizing plate 443b. In such a manner, the color filter 450 may be provided on an outer side of the first substrate 441 or/and the second substrate 442 between which the liquid crystal layer 444 is sandwiched.

FIGS. 17A to 17D illustrate the process for manufacturing the liquid crystal display device illustrated in FIGS. 4A and 4B.

Note that the pixel electrode layer, the first common electrode layer, and the second common electrode layer which are included are omitted in FIGS. 17A to 17D. For example, the pixel electrode layer, the first common electrode layer, and the second common electrode layer can have structures described in Embodiments 1 and 2. The oblique electric field mode which is generated in such a manner that the pixel electrode layer over the structure body which is provided so as to project into the liquid crystal layer is positioned between the first common electrode layer and the second common electrode layer can be employed.

Figure 17A:
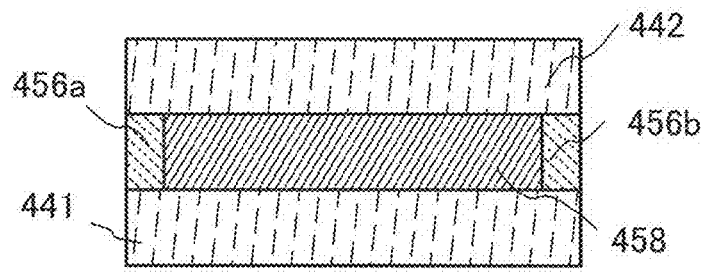
FIGS. 17A to 17D are cross-sectional views illustrating a method for manufacturing a liquid crystal display device.

As illustrated in FIG. 17A, the first substrate 441 and the second substrate 442 which functions as a counter substrate are firmly attached to each other with the sealants 456a and 456b with the liquid crystal layer 458 interposed therebetween. The liquid crystal layer 458 can be formed by a dispenser method (a dropping method), or an injecting method by which a liquid crystal is injected using a capillary phenomenon after the first substrate 441 is attached to the second substrate 442.

A blue phase liquid crystal material can be used for the liquid crystal layer 458. The liquid crystal layer 458 is formed using a liquid crystal material including a liquid crystal, a chiral agent, a photocurable resin, and a photopolymerization initiator.

Figure 17B:
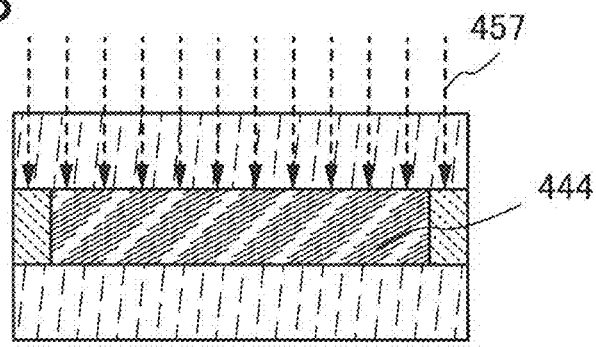

As illustrated in FIG. 17B, polymer stabilization treatment is conducted by irradiating the liquid crystal layer 458 with the light 457 so that the liquid crystal layer 444 is formed. The light 457 is light having a wavelength with which the photocurable resin and the photopolymerization initiator included in the liquid crystal layer 458 are reacted. By such polymer stabilization treatment using light irradiation, the temperature range where the liquid crystal layer 458 exhibits a blue phase can be increased.

In the case where, for example, a photocurable resin such as an ultraviolet curable resin is used for a sealant and a liquid crystal layer is formed by a dropping method, the sealant may be cured in the light irradiation step for the polymer stabilization treatment.

Figure 17C:
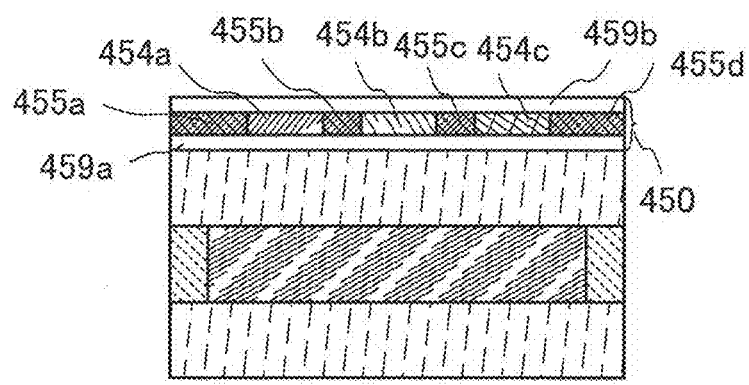

Next, as illustrated in FIG. 17C, the color filter 450 is provided on a second substrate 442 side which is a viewing side. The color filter 450 includes the chromatic-color light-transmitting resin layers 454a, 454b, and 454c which each function as a color filter layer and the light-blocking layers 455a, 455b, 455c, and 455d which each function as a black matrix layer between a pair of substrates 459a and 459b and the color filter 450 has a structure in which the chromatic-color light-transmitting resin layers 454a, 454b, and 454c are formed between the light-blocking layers 455a and 455b, between the light-blocking layers 455b and 455c, and between the light-blocking layers 455c and 455d, respectively.

Figure 17D:
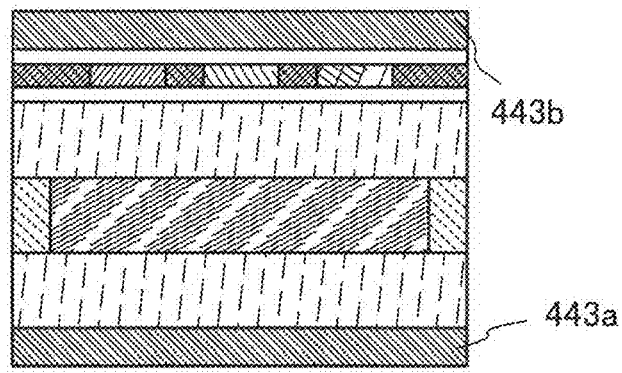

As illustrated in FIG. 17D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the color filter 450. In addition to the polarizing plate, an optical film such as a retardation plate or an anti-reflection film may be provided. Light circularly polarized by a polarizing plate and a retardation plate may be used, for example. Through these steps, the liquid crystal display device can be completed.

In addition, in the case of manufacturing a plurality of liquid crystal display devices using a large-sized substrate (a so-called multiple panel method), a division step can be conducted before the polymer stabilization treatment or before provision of the polarizing plates. In consideration of the influence of the division step on the liquid crystal layer (such as alignment disorder due to force applied in the division step), it is preferable that the division step be conducted after the first substrate is attached to the second substrate and before the polymer stabilization treatment is conducted.

Although not illustrated, a backlight, a sidelight, or the like may be used as a light source. Light from the light source is emitted from the side of the first substrate 441 which functions as an element substrate, so as to pass through the second substrate 442 on a viewing side.

The pixel electrode layer is provided over the structure body which is formed so as to project into the liquid crystal layer and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

(Embodiment 4)

A liquid crystal display device including a light-blocking layer (a black matrix) is described with reference to FIGS. 5A and 5B.

Figure 5A:
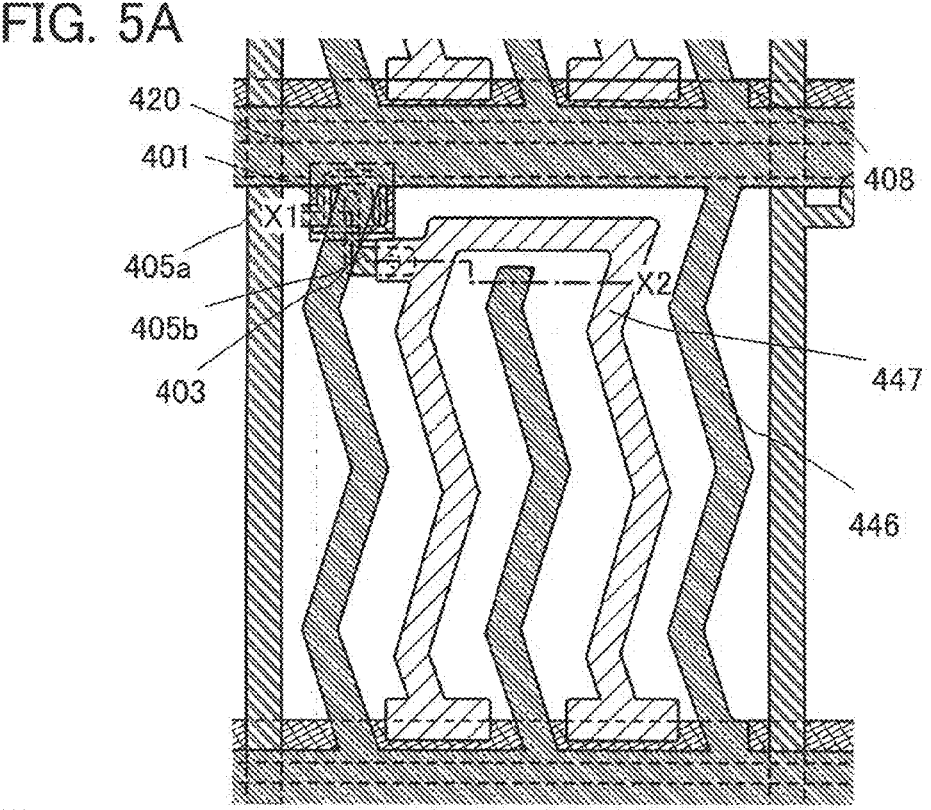
FIGS. 5A and 5B are views illustrating a liquid crystal display device.
Figure 5B:
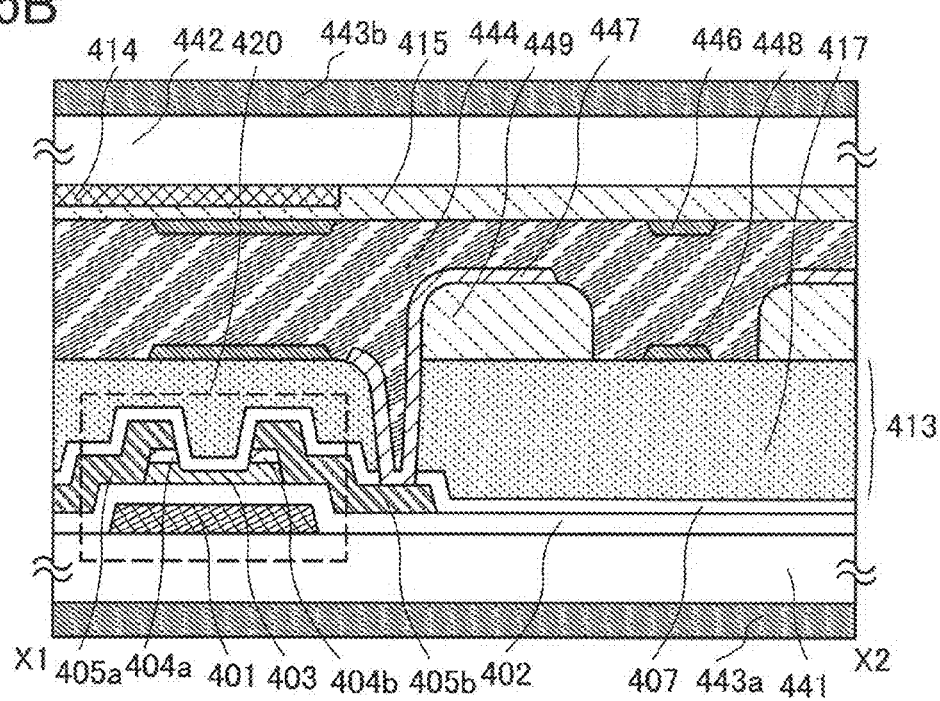

The liquid crystal display device illustrated in FIGS. 5A and 5B is an example in which a light-blocking layer 414 is further formed on the side of the second substrate 442 which functions as a counter substrate in the liquid crystal display device illustrated in FIGS. 2A and 2B of Embodiment 2. Therefore, components in common with those in Embodiment 2 can be formed using a similar material and manufacturing method, and detailed description of the same portions and portions having similar functions is omitted.

FIG. 5A is a plan view of the liquid crystal display device. FIG. 5B is a cross-sectional view taken along the line X1-X2 in FIG. 5A. Note that the plan view of FIG. 5A illustrates only the element substrate side and the counter substrate side is not illustrated.

The light-blocking layer 414 is formed on the liquid crystal layer 444 side of the second substrate 442 and an insulating layer 415 is formed as a planarization film. The light-blocking layer 414 is preferably formed in a region corresponding to the thin film transistor 420 (a region which overlaps the semiconductor layer of the thin film transistor) with the liquid crystal layer 444 interposed therebetween. The first 15 substrate 441 and the second substrate 442 are firmly attached to each other with the liquid crystal layer 444 interposed therebetween so that the light-blocking layer 414 is positioned to cover at least a portion above the semiconductor layer 403 of the thin film transistor 420.

The light-blocking layer 414 is formed using a light-blocking material which reflects or absorbs light. For example, a black organic resin can be used, and the light-blocking layer 414 can be formed by mixing a black resin of a pigment material, carbon black, titanium black, or the like into a resin material such as photosensitive or non-photosensitive polyimide. Alternatively, a light-blocking metal film can be used, and the light-blocking layer 414 may be formed using chromium, molybdenum, nickel, titanium, cobalt, copper, tungsten, aluminum, or the like, for example.

The method for forming the light-blocking layer 414 is not particularly limited, and a dry method such as evaporation, sputtering, or CVD or a wet method such as spin coating, dip coating, spray coating, or droplet discharging (for example, ink jetting screen printing, or offset printing) may be used in accordance with the material. As needed, an etching method (dry etching or wet etching) may be employed to form a desired pattern.

The insulating layer 415 may be formed using an organic resin or the like such as acrylic or polyimide by a coating method such as spin coating or various printing methods.

When the light-blocking layer 414 is further provided on the counter substrate side in this manner, contrast can be increased and the thin film transistor can be stabilized more. The light-blocking layer 414 can block light incident on the semiconductor layer 403 of the thin film transistor 420; accordingly, electrical characteristics of the thin film transistor 420 can be prevented from being varied due to photosensitivity of the semiconductor and can be stabilized more. Further, the light-blocking layer 414 can prevent light leakage to an adjacent pixel, which enables higher contrast and higher definition display. Therefore, high definition and high reliability of the liquid crystal display device can be achieved.

The pixel electrode layer is provided over the structure body which is formed so as to project into the liquid crystal layer and positioned, in the liquid crystal layer, between the first common electrode layer and the second common electrode layer, and the oblique electric field is foamed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

This embodiment can be combined with the structure described in any of the other embodiments as appropriate.

(Embodiment 5)

A liquid crystal display device including a light-blocking layer (a black matrix) is described with reference to FIGS. 6A and 6B.

Figure 6A:
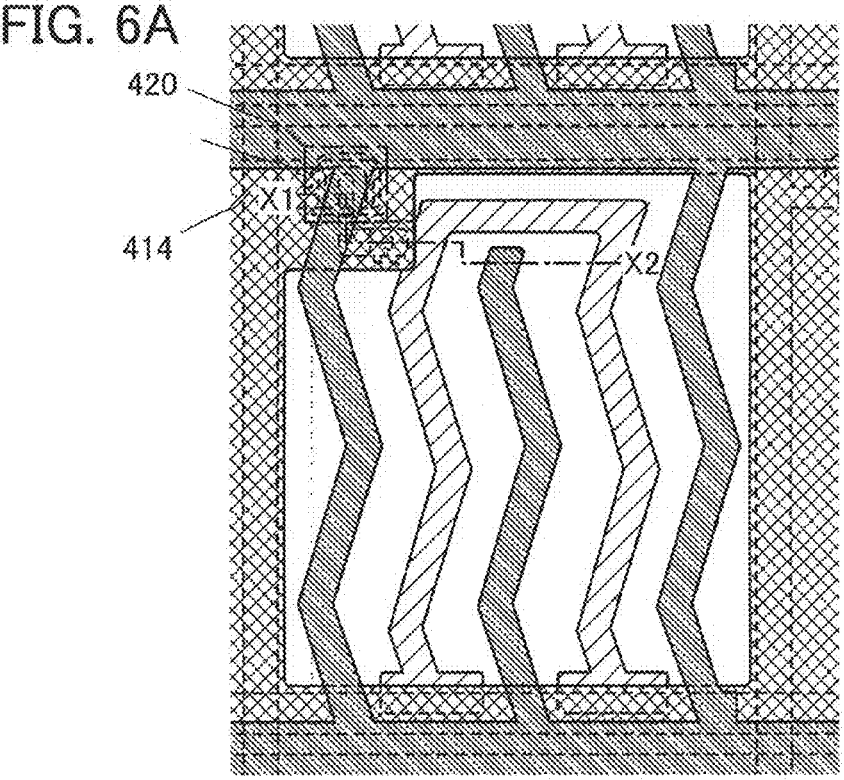
FIGS. 6A and 6B are views illustrating a liquid crystal display device.
Figure 6B:
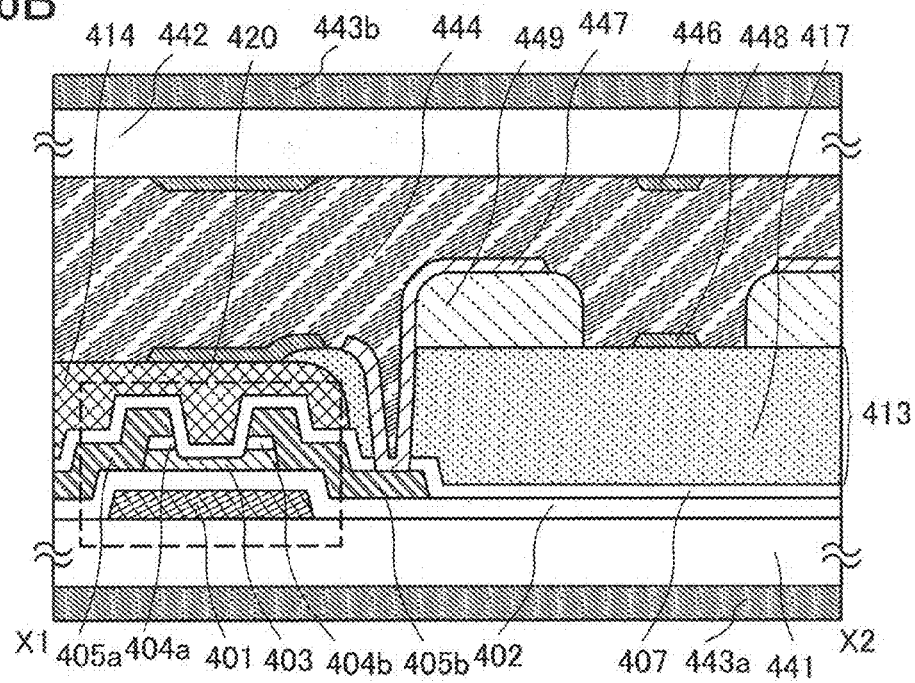

The liquid crystal display device illustrated in FIGS. 6A and 6B is an example in which the light-blocking layer 414 is formed as part of the interlayer film 413 on the first substrate (the element substrate) 441 side in the liquid crystal display device illustrated in FIGS. 2A and 2B of Embodiment 2. Therefore, components in common with those in Embodiment 2 can be formed using a similar material and manufacturing method, and detailed description of the same portions and portions having similar functions is omitted.

FIG. 6A is a plan view of the liquid crystal display device. FIG. 6B is a cross-sectional view taken along the line X1-X2 in FIG. 6A.

The interlayer film 413 includes the light-blocking layer 414 and the chromatic-color light-transmitting resin layer 417. The light-blocking layer 414 is provided on the side of the first substrate 441 which functions as an element substrate and formed over the thin film transistor 420 (at least in a region which covers a semiconductor layer of the thin film transistor) with the insulating film 407 interposed therebetween, so that the light-blocking layer 414 functions as a light-blocking layer for the semiconductor layer. On the contrary, the chromatic-color light-transmitting resin layer 417 is formed so that the first electrode layer 447, the second electrode layer 446, and the third electrode layer 448 are overlapped with the chromatic-color light-transmitting resin layer 417 and the chromatic-color light-transmitting resin layer 417 functions as a color filter layer. In the liquid crystal display device of FIG. 6B, part of the third electrode layer 448 is formed over the light-blocking layer 414 and the liquid crystal layer 444 is provided thereover.

Since the light-blocking layer 414 is used as the interlayer film, it is preferable that a black organic resin be used for the light-blocking layer 414. For example, a black resin of a pigment material, carbon black, titanium black, or the like may be mixed into a resin material such as photosensitive or non-photosensitive polyimide. As the method for forming the light-blocking layer 414, a wet method such as spin coating, dip coating, spray coating, or droplet discharging (for example, ink jetting, screen printing, or offset printing) may be used in accordance with the material. As needed, an etching method (dry etching or wet etching) may be employed to form a desired pattern.

When the light-blocking layer 414 is provided in this manner, the light-blocking layer 414 can block light incident on the semiconductor layer 403 of the thin film transistor 420 without reduction in an aperture ratio of a pixel; accordingly, electrical characteristics of the thin film transistor 420 can be prevented from being varied and can be stabilized. Further, the light-blocking layer 414 can prevent light leakage to an adjacent pixel, which enables higher contrast and higher definition display. Therefore, high definition and high reliability of the liquid crystal display device can be achieved.

Further, the chromatic-color light-transmitting resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the chromatic-color light-transmitting resin layer 417 included in the interlayer film is formed directly on the element substrate side as a color filter layer, the formation region can be controlled more precisely and this structure is adjustable to a pixel with a fine pattern. In addition, one insulating layer can function as both the interlayer film and the color filter layer, whereby the process can be simplified and a liquid crystal display device can be manufactured at low cost.

The pixel electrode layer is provided over the structure body which is formed so as to project into the liquid crystal layer and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

This embodiment can be combined with the structure described in any of the other embodiments as appropriate.

(Embodiment 6)

Another example of a thin film transistor which can be applied to the liquid crystal display devices in Embodiments 1 to 5 is described. Note that components in common with those in Embodiments 2 to 5 can be formed using a similar material and manufacturing method, and detailed description of the same portions and portions having similar functions is omitted.

Figure 10A:
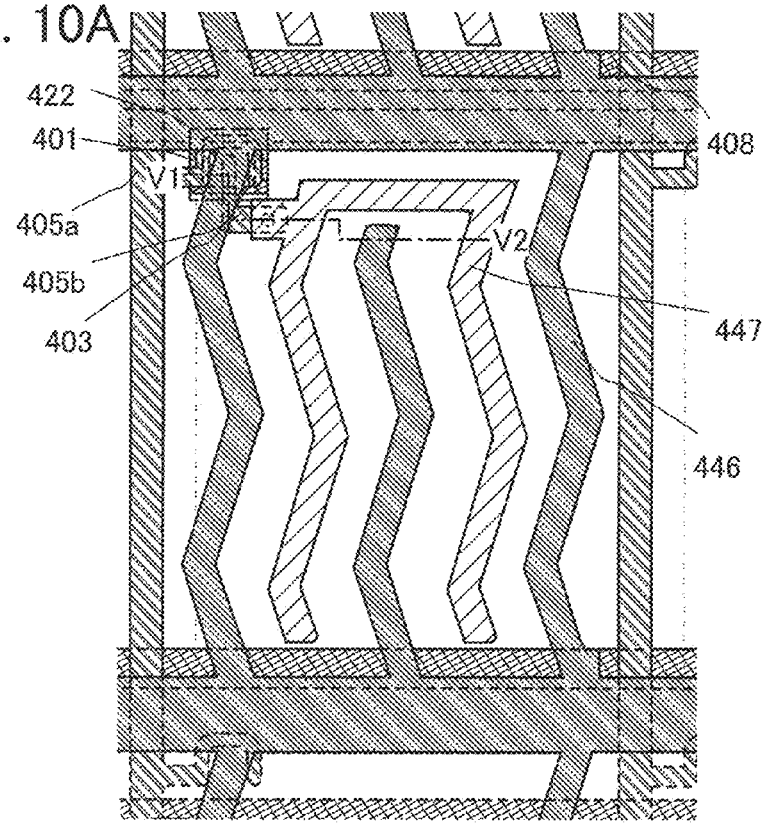
FIGS. 10A and 10B are views illustrating a liquid crystal display device.
Figure 10B:
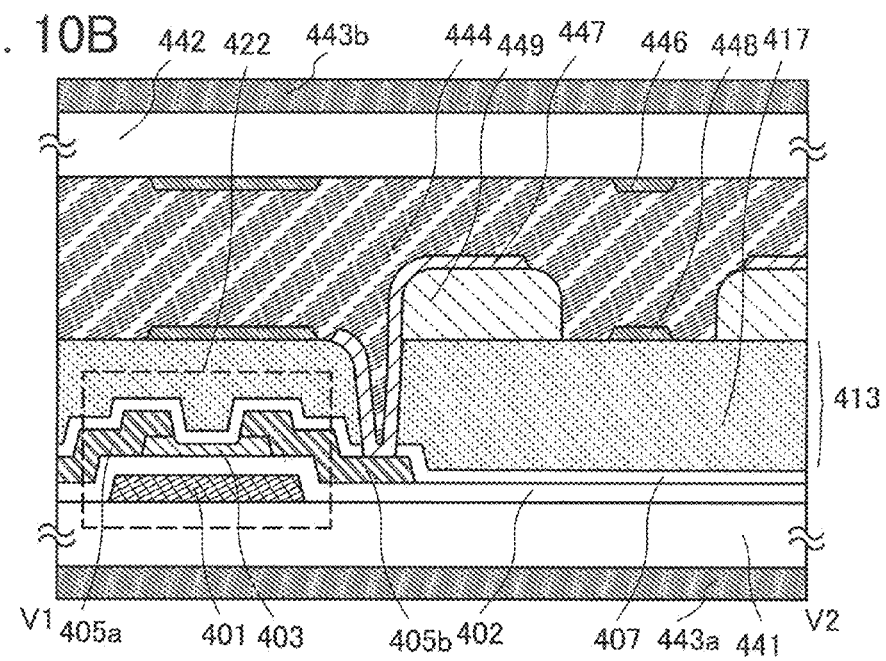

FIGS. 10A and 10B illustrate an example of a liquid crystal display device including a thin film transistor which has a structure in which source and drain electrode layers are in contact with a semiconductor layer without an n+ layer interposed therebetween.

FIG. 10A is a plan view of a liquid crystal display device and illustrates one pixel. FIG. 10B is a cross-sectional view taken along the line V1-V2 in FIG. 10A.

In the plan view of FIG. 10A, in a manner similar to Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with the pixel electrode layer, the first common electrode layer, and the second common electrode layer of a liquid crystal display device. A thin film transistor 422 for driving the pixel electrode layer is provided at an upper left corner of the drawing. The plurality of pixel electrode layers and thin film transistors are arranged in matrix.

The first substrate 441 which is provided with the thin film transistor 422, the interlayer film 413 which is a chromatic-color light-transmitting resin layer, and the first electrode layer 447 and the second substrate 442 which is provided with the second electrode layer 446 are firmly attached to each other with the liquid crystal layer 444 interposed therebetween.

The thin film transistor 422 has a structure in which the semiconductor layer 403 is in contact with the wiring layers 405a and 405b which function as source and drain electrode layers without an n+ layer interposed therebetween.

The pixel electrode layer is provided over the structure body which is formed so as to project into the liquid crystal layer and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

This embodiment can be combined with the structure described in any of the other embodiments as appropriate.
(Embodiment 7)

Another example of a thin film transistor which can be applied to the liquid crystal display devices in Embodiments 1 to 5 is described with reference to FIGS. 9A and 9B.

Figure 9A:
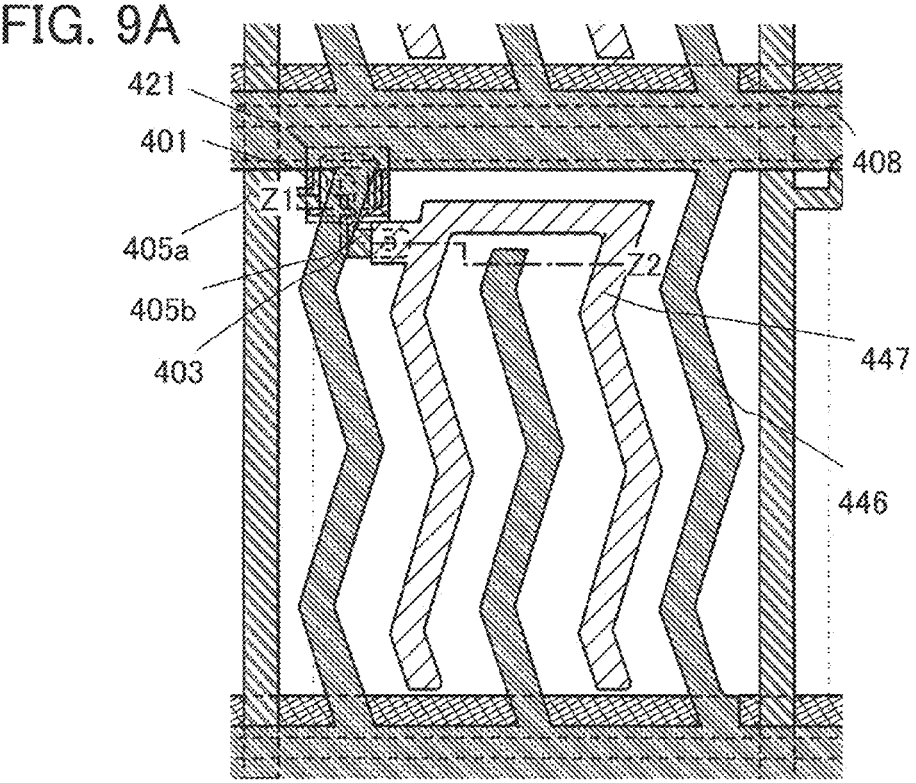
FIGS. 9A and 9B are views illustrating a liquid crystal display device.
Figure 9B:
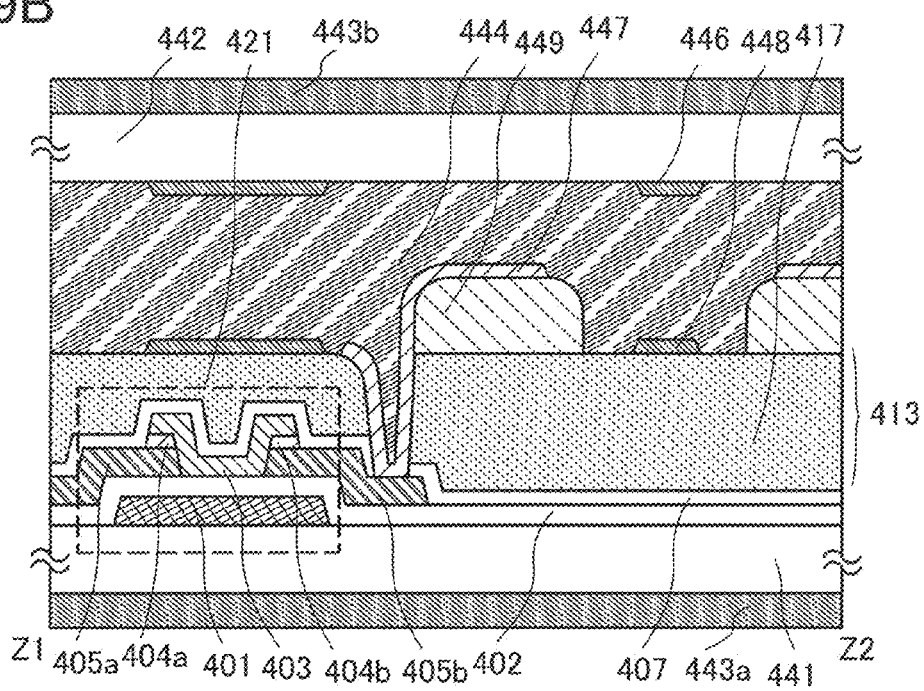

FIG. 9A is a plan view of a liquid crystal display device and illustrates one pixel. FIG. 9B is a cross-sectional view taken along the line Z1-Z2 in FIG. 9A.

In the plan view of FIG. 9A, in a manner similar to Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with the pixel electrode layer, the first common electrode layer, and the second common electrode layer of a liquid crystal display device. A thin film transistor 421 for driving the pixel electrode layer is provided at an upper left corner of the drawing. The plurality of pixel electrode layers and thin film transistors are arranged in matrix.

The first substrate 441 which is provided with the thin film transistor 421, the interlayer film 413 which is a chromatic-color light-transmitting resin layer, and the first electrode layer 447 and the second substrate 442 which is provided with the second electrode layer 446 are thinly attached to each other with the liquid crystal layer 444 interposed therebetween.

The thin film transistor 421 is a bottom-gate thin film transistor and includes, over the first substrate 441 having an insulating surface, the gate electrode layer 401, the gate insulating layer 402, the wiring layers 405a and 405b which function as source and drain electrode layers, the n' layers 404a and 404b which function as source and drain regions, and the semiconductor layer 403. In addition, the insulating film 407 which covers the thin film transistor 421 and is in contact with the semiconductor layer 403 is provided.

Note that the n+ layers 404a and 404b may be provided between the gate insulating layer 402 and the wiring layer 405a and between the gate insulating layer 402 and the wiring layer 405b, respectively. Alternatively, the n+ layers may be provided both between the gate insulating layer and the wiring layer and between the wiring layer and the semiconductor layer.

The gate insulating layer 402 exists in the entire region including the thin film transistor 421, and the thin film transistor 421 is provided with the gate electrode layer 401 between the gate insulating layer 402 and the first substrate 441 which is a substrate having an insulating surface. The wiring layers 405a and 405b and the n+ layers 404a and 404b are provided over the gate insulating layer 402. In addition, the semiconductor layer 403 is provided over the gate insulating layer 402, the wiring layers 405a and 405b, and the n' layers 404a and 404b. Although not illustrated, a wiring layer is provided over the gate insulating layer 402 in addition to the wiring layers 405a and 405b, and the wiring layer extends beyond the perimeter of the semiconductor layer 403 to the outside.

The pixel electrode layer is provided over the structure body which is formed so as to project into the liquid crystal layer and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

This embodiment can be combined with the structure described in any of the other embodiments as appropriate.

(Embodiment 8)

Another example of a thin film transistor which can be applied to the liquid crystal display devices in Embodiments 2 to 5 is described. Note that components in common with those in Embodiments 2 to 5 can be formed using a similar material and manufacturing method, and detailed description of the same portions and portions having similar functions is omitted.

Figure 11A:
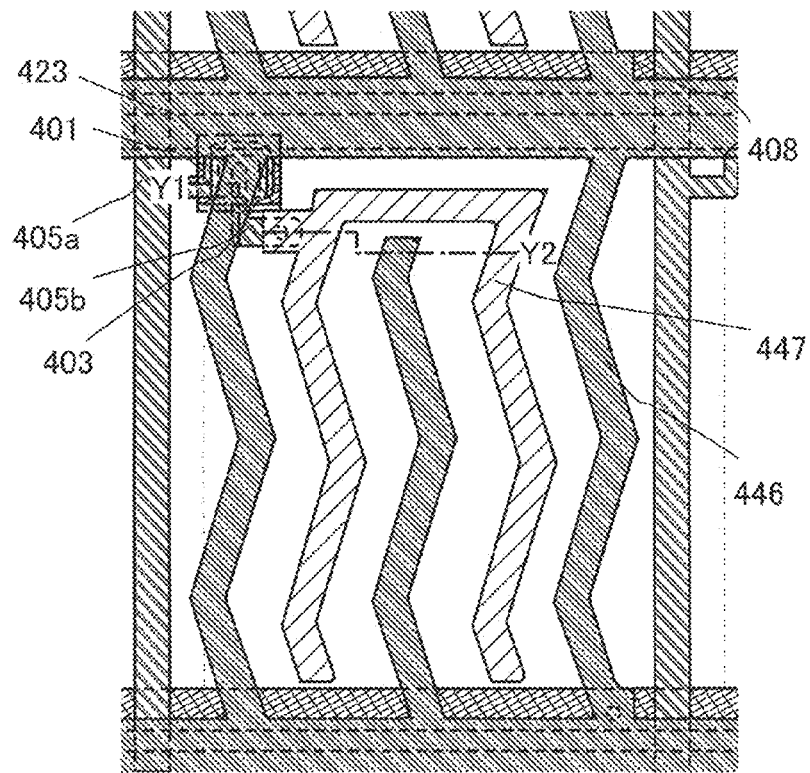
FIGS. 11A and 11B are views illustrating a liquid crystal display device.
Figure 11B:
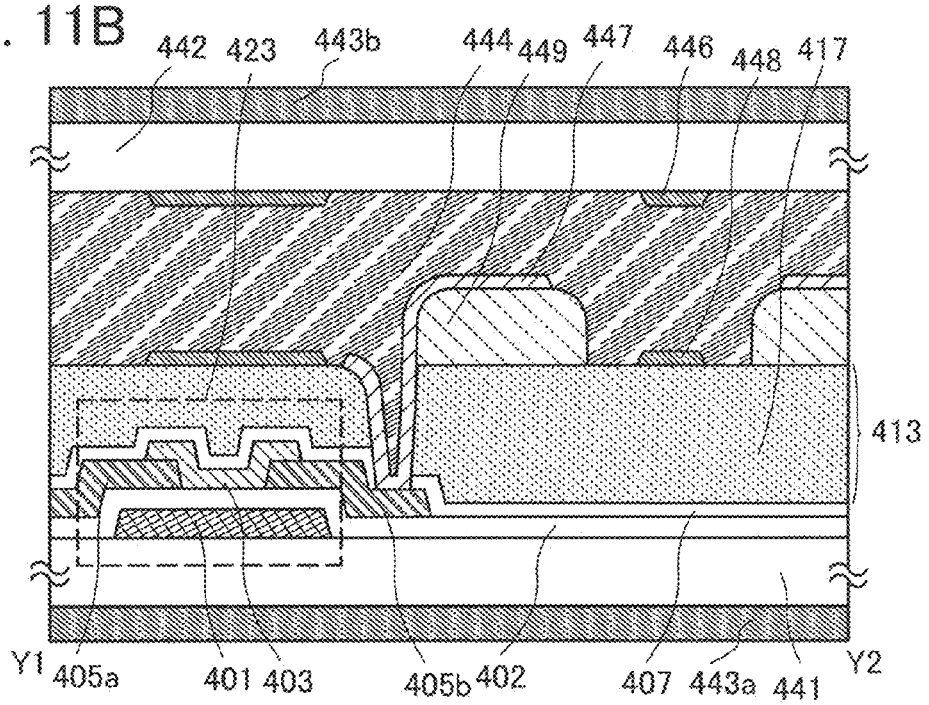

FIGS. 11A and 11B illustrate an example of a liquid crystal display device including a thin film transistor which has a structure in which source and drain electrode layers are in contact with a semiconductor layer without an n$^+$ layer interposed therebetween.

FIG. 11A is a plan view of a liquid crystal display device and illustrates one pixel. FIG. 11B is a cross-sectional view taken along the line Y1-Y2 in FIG. 11A.

In the plan view of FIG. 11A, in a manner similar to Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with the pixel electrode layer, the first common electrode layer, and the second common electrode layer of a liquid crystal display device. A thin film transistor 423 for driving the pixel electrode layer is provided at an upper left corner of the drawing. The plurality of pixel electrode layers and thin film transistors are arranged in matrix.

The first substrate 441 which is provided with the thin film transistor 423, the interlayer film 413 which is a chromatic-color light-transmitting resin layer, and the first electrode layer 447 and the second substrate 442 which is provided with the second electrode layer 446 are firmly attached to each other with the liquid crystal layer 444 interposed therebetween.

The gate insulating layer 402 exists in the entire region including the thin film transistor 423, and the thin film transistor 423 is provided with the gate electrode layer 401 between the gate insulating layer 402 and the first substrate 441 which is a substrate having an insulating surface. The wiring layers 405a and 405b are provided over the gate insulating layer 402. In addition, the semiconductor layer 403 is provided over the gate insulating layer 402 and the wiring layers 405a and 405b. Although not illustrated, a wiring layer is provided over the gate insulating layer 402 in addition to the wiring layers 405a and 405b and the wiring layer extends beyond the perimeter of the semiconductor layer 403 to the outside.

The pixel electrode layer is provided over the structure body which is formed so as to project into the liquid crystal layer and positioned, in the liquid crystal layer, between the first common electrode layer and the second common electrode layer, and the oblique electric field is formed between the pixel electrode layer and the first common electrode layer which is provided on the second substrate, and between the pixel electrode layer and the second common electrode layer which is provided over the first substrate, so that the oblique electric fields can be formed in the entire liquid crystal layer.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

Through these steps, the contrast ratio of the liquid crystal display device using a blue phase liquid crystal layer can be increased.

This embodiment can be combined with the structure described in any of the other embodiments as appropriate.

(Embodiment 9)

An example of a material which can be used for the semiconductor layers of the thin film transistors in Embodiments 1 to 8 is described. The semiconductor material which is used for a semiconductor layer of a thin film transistor included in the liquid crystal display device disclosed in this specification is not particularly limited.

As a material for a semiconductor layer included in the semiconductor element, it is possible to use an amorphous semiconductor (hereinafter also referred to as an AS) which is formed by a sputtering method or a vapor-phase growth method using a semiconductor material gas typified by silane or germane, a polycrystalline semiconductor which is obtained by crystallizing the amorphous semiconductor by utilizing light energy or thermal energy, a microcrystalline semiconductor (also referred to as a semi-amorphous or microcrystal semiconductor, and hereinafter also referred to as an SAS), or the like. The semiconductor layer can be deposited by a sputtering method, an LPCVD method, a plasma CVD method, or the like.

Considering Gibbs free energy, the microcrystalline semiconductor film is in a metastable state which is intermediate between an amorphous state and a single crystal state. That is, the microcrystalline semiconductor is in a third state which is stable in free energy, and has short-range order and lattice distortion. Furthermore, columnar or needle-like crystals grow in the direction of the normal to the surface of the substrate. The Raman spectrum of microcrystalline silicon, which is a typical example of a microcrystalline semiconductor, is shifted to a lower wavenumber side than 520 cm$^{-1}$ that represents single crystal silicon. In other words, the Raman spectrum of microcrystalline silicon has a peak between 480 cm$^{-1}$ that represents amorphous silicon and 520 cm$^{-1}$ that represents single crystal silicon. Furthermore, the microcrystalline semiconductor film contains at least 1 at. % or more of hydrogen or halogen to terminate dangling bonds. The microcrystalline semiconductor film may contain a rare gas element such as helium, argon, krypton, or neon to further promote lattice distortion, whereby a favorable microcrystalline semiconductor film with improved stability can be obtained.

This microcrystalline semiconductor film can be formed using a high-frequency plasma CVD apparatus with a frequency of several tens of megahertz to several hundreds of megahertz, or a microwave plasma CVD apparatus with a frequency of 1 GHz or more. Typically, the microcrystalline semiconductor film can be formed using silicon hydride (for example, $SiH_4$, $Si_2H_6$, $SiH_2Cl_2$, $SiHCl_3$, $SiCl_4$, or $SiF_4$) that is diluted with hydrogen. Furthermore, the microcrystalline semiconductor film can be formed with a dilution of silicon hydride, hydrogen, and one or more kinds of rare gas elements selected from helium, argon, krypton, and neon. In such a case, the flow rate of hydrogen is 5 times to 200 times, preferably 50 times to 150 times, and more preferably 100 times higher than that of silicon hydride.

The amorphous semiconductor is typified by hydrogenated amorphous silicon, and the crystalline semiconductor is typified by polysilicon or the like. Polysilicon (polycrystalline silicon) includes so-called high-temperature polysilicon which contains polysilicon formed at a process temperature of 800° C. or higher as its main component, so-called low-temperature polysilicon which contains polysilicon formed at a process temperature of 600° C. or lower as its main component, polysilicon formed by crystallizing amorphous silicon by using, for example, an element which promotes crystallization, and the like. It is needless to say that a microcrystalline semiconductor or a semiconductor partly including a crystalline phase in a semiconductor layer can also be used as described above.

In addition, as a material for the semiconductor, a compound semiconductor such as GaAs, InP, SiC, ZnSe, GaN, or SiGe can be used as well as an element such as silicon (Si) or germanium (Ge).

In the case of using a crystalline semiconductor film for the semiconductor layer, the crystalline semiconductor film may be formed by various methods (for example, a laser crystallization method, a thermal crystallization method, or a thermal crystallization method using an element which promotes crystallization, such as nickel). Alternatively, a microcrystalline semiconductor, which is an SAS, may be crystallized by laser light irradiation to increase crystallinity. In the case where an element which promotes crystallization is not introduced, before being irradiated with laser light, an amorphous silicon film is heated at 500° C. for one hour under a nitrogen atmosphere, whereby hydrogen contained in the amorphous silicon film is released to a concentration of $1\times10^{20}$ atoms/$cm^3$ or less. This is because, if the amorphous silicon film contains much hydrogen, the amorphous silicon film is broken by laser light irradiation.

There is no particular limitation on a method of introducing a metal element into the amorphous semiconductor film as long as the metal element can exist on the surface of or inside the amorphous semiconductor film. For example, a sputtering method, a CVD method, a plasma processing method (including a plasma CVD method), an adsorption method, or a method of applying a metal salt solution can be employed. Among them, the method using a solution is simple and easy, and is useful in terms of easy concentration adjustment of the metal element. At this time, an oxide film is preferably deposited by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution over the entire surface of the amorphous semiconductor film.

In a crystallization step for crystallizing the amorphous semiconductor film to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element that promotes crystallization, it is possible to use one or more kinds of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au).

In order to remove or reduce the element that promotes crystallization from the crystalline semiconductor film, a semiconductor film containing an impurity element is formed in contact with the crystalline semiconductor film so as to function as a gettering sink. As the impurity element, an impurity element imparting n-type conductivity, and an impurity element imparting p-type conductivity, a rare gas element, or the like can be used. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor film containing a rare gas element is formed on the crystalline semiconductor film containing the element that promotes crystallization, and then heat treatment is conducted (at 550° C. to 750° C. for 3 minutes to 24 hours). The element promoting crystallization that is contained in the crystalline semiconductor film moves into the semiconductor film containing a rare gas element, and thus the element promoting crystallization that is contained in the crystalline semiconductor film is removed or reduced. After that, the semiconductor film containing a rare gas element, which has functioned as a gettering sink, is removed.

The amorphous semiconductor film may be crystallized by a combination of thermal treatment and laser light irradiation. Alternatively, either thermal treatment or laser light irradiation may be conducted a plurality of times.

A crystalline semiconductor film can also be formed directly over the substrate by a plasma method. Alternatively, a crystalline semiconductor film may be selectively formed over the substrate by a plasma method.

In addition, an oxide semiconductor may be formed for the semiconductor layer. For example, zinc oxide (ZnO), tin oxide ($SnO_2$), or the like can also be used. In the case where ZnO is used for the semiconductor layer, $Y_2O_3$, $Al_2O_3$, $TiO_2$, a stacked layer of them, or the like can be used for the gate insulating layer, and ITO, Au, Ti, or the like can be used for the gate electrode layer, the source electrode layer, and the drain electrode layer. In addition, In, Ga, or the like can be added to ZnO.

As the oxide semiconductor, a thin film represented by $InMO_3(ZnO)_m$ (m>0) is preferably used. Note that M denotes one or more of metal elements selected from gallium (Ga), iron (Fe), nickel (Ni), manganese (Mn), and cobalt (Co). In addition to a case where only Ga is contained as M, there is a case where Ga and the above metal elements other than Ga are contained as M, for example, M contains Ga and Ni or Ga and Fe. Moreover, in the oxide semiconductor, in some cases, a transition metal element such as Fe or Ni or an oxide of the transition metal is contained as an impurity element in addition to a metal element contained as M. For example, an In—Ga—Zn—O-based non-single-crystal film can be used as the oxide semiconductor layer.

As the oxide semiconductor layer (the $InMO_3(ZnO)_m$ film (m>0)), an $InMO_3(ZnO)_m$ film (m>0) in which M is a different metal element may be used instead of the In—Ga—Zn—O-based non-single-crystal film.

When a blue phase liquid crystal material is used, rubbing treatment on an alignment film is unnecessary; accordingly, electrostatic discharge damage caused by the rubbing treatment can be prevented and defects and damage of the liquid crystal display device in the manufacturing process can be reduced. Thus, productivity of the liquid crystal display device can be increased. A thin film transistor which uses an oxide semiconductor layer particularly has a possibility that electrical characteristics of the thin film transistor may fluctuate significantly by the influence of static electricity and deviate from the designed range. Therefore, it is more effective to use a blue phase liquid crystal material for a liquid crystal display device including a thin film transistor which uses an oxide semiconductor layer.

This embodiment can be combined with the structure described in any of the other embodiments as appropriate.
(Embodiment 10)

Figure 3A:
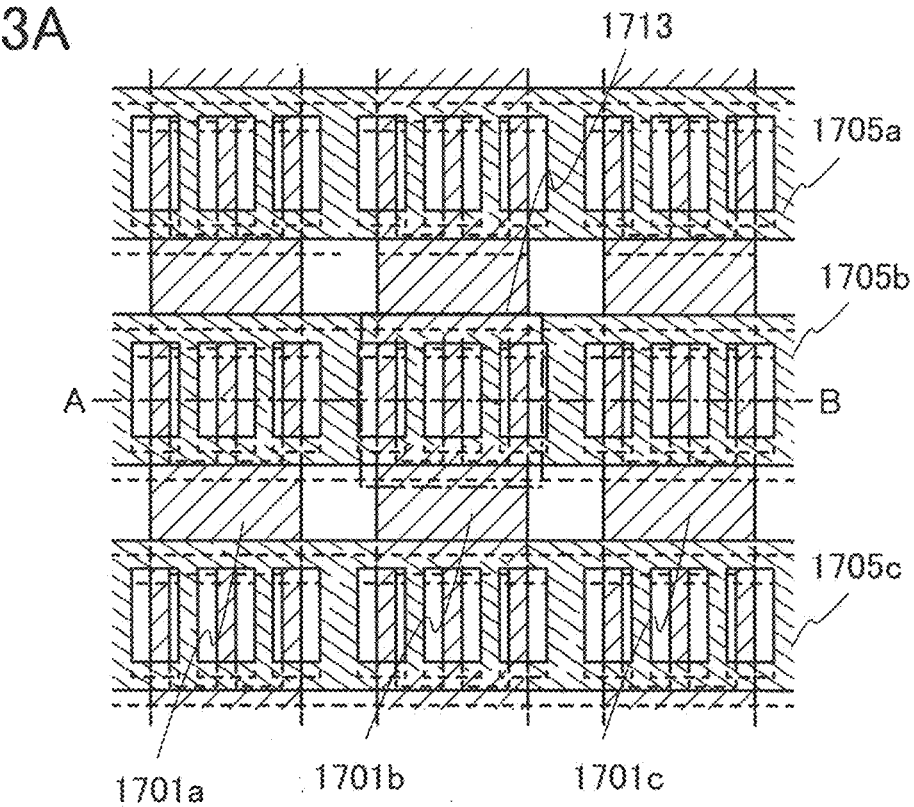
FIGS. 3A and 3B are views illustrating a liquid crystal display device.
Figure 3B:
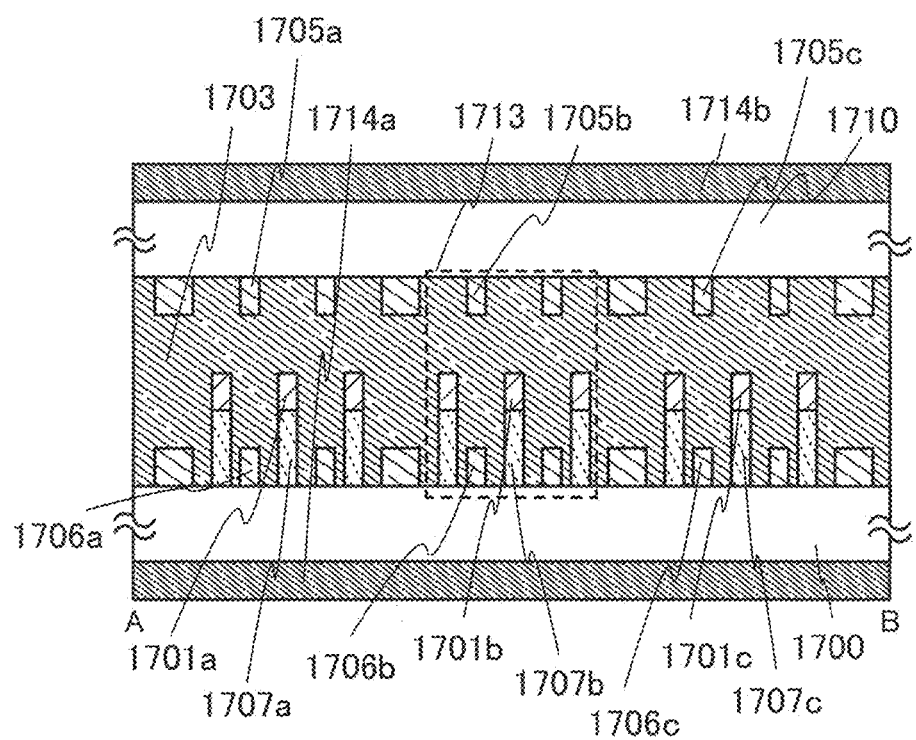

The invention disclosed in this specification is applicable to a passive-matrix liquid crystal display device and an active-matrix liquid crystal display device. An example of a passive-matrix liquid crystal display device is described with reference to FIGS. 3A and 3B. FIG. 3A is a top view of the liquid crystal display device, and FIG. 3B is a cross-sectional view taken along the line A-B in FIG. 3A. In addition, in FIG. 3A, a liquid crystal layer 1703, a substrate 1710 which functions as a counter substrate, polarizing plates 1714a and 1714b, and the like are omitted and not illustrated; however, they are provided as illustrated in FIG. 3B.

FIGS. 3A and 3B illustrate a liquid crystal display device in which a substrate 1700 which is provided with the polarizing plate 1714a and the substrate 1710 which is provided with the polarizing plate 1714b are positioned to face each other with the liquid crystal layer 1703 including a blue phase liquid crystal material interposed therebetween. Structure bodies 1707a, 1707b, and 1707c, pixel electrode layers 1701a, 1701b, and 1701c, and second common electrode layers 1706a, 1706b, and 1706c are provided between the substrate 1700 and the liquid crystal layer 1703. First common electrode layers 1705a, 1705b, and 1705c are provided between the substrate 1710 and the liquid crystal layer 1703. The structure bodies 1707a, 1707b, and 1707c are provided so as to project into the liquid crystal layer 1703 from a surface of the substrate 1700 on a liquid crystal layer 1703 side.

The pixel electrode layer (including 1701a, 1701b, and 1701c), the first common electrode layer (including 1705a, 1705b, and 1705c), and the second common electrode layer (including 1706a, 1706b, and 1706c) each have opening patterns which include a rectangular opening (slit) in a pixel region of a liquid crystal element 1713.

The second common electrode layers 1706a, 1706b, and 1706c are formed over the substrate 1700 and the first common electrode layers 1705a, 1705b, and 1705c are formed on the substrate 1710. The second common electrode layers 1706a, 1706b, and 1706c and the first common electrode layers 1705a, 1705b, and 1705c are positioned to face each other with the liquid crystal layer 1703 interposed therebetween. It is preferable that the first common electrode layers 1705a, 1705b, and 1705c and the second common electrode layers 1706a, 1706b, and 1706c be positioned at least in a pixel region so as to have the same shape and overlap each other with the liquid crystal layer 1703 interposed therebetween so that the aperture ratio of a pixel is not reduced.

The pixel electrode layers 1701a, 1701b, and 1701c are formed over the structure bodies 1707a, 1707b, and 1707c which are provided so as to project into the liquid crystal layer 1703 from the surface of the substrate 1700 on the liquid crystal layer 1703 side. In a thickness direction of the liquid crystal layer 1703, the pixel electrode layers 1701a, 1701b, and 1701c are positioned between the first common electrode layer 1705a and the second common electrode layer 1706a, between the first common electrode layer 1705b and the second common electrode layer 1706b, and between the first common electrode layer 1705c and the second common electrode layer 1706c.

If the pixel electrode layers are positioned between the first common electrode layers and the second common electrode layers, as described in Embodiment 1, the first common electrode layers and the second common electrode layers may be formed over the structure bodies which are provided so as to project into the liquid crystal layer.

The pixel electrode layers 1701a, 1701b, and 1701c are provided over the structure bodies 1707a, 1707b, and 1707c, which are formed so as to project into the liquid crystal layer 1703, and positioned between the first common electrode layers 1705a, 1705b, and 1705c and the second common electrode layers 1706a, 1706b, and 1706c in the liquid crystal layer 1703. Therefore, the oblique electric fields are formed between the pixel electrode layers 1701a, 1701b, and 1701c and the first common electrode layers 1705a, 1705b, 1705c, and the oblique electric fields are formed between the pixel electrode layers 1701a, 1701b, and 1701c and the second common electrode layers 1706a, 1706b, 1706c which are provided over the substrate 1700, so that the oblique electric fields can be formed in the entire liquid crystal layer 1703.

Therefore, liquid crystal molecules in the entire liquid crystal layer, which also includes the liquid crystal molecules in a thickness direction, can be made to respond and white transmittance can be improved. Accordingly, the contrast ratio which is a ratio of white transmittance to black transmittance can also be increased.

In addition, a coloring layer which functions as a color filter may be provided, and the color filter may be provided on inner side of the substrate 1700 or/and the substrate 1710 with respect to the liquid crystal layer 1703, between the substrate 1710 and the polarizing plate 1714b, or between the substrate 1700 and the polarizing plate 1714a.

A color filter may be formed using materials which exhibit red (R), green (G), and blue (B) in the case where the liquid crystal display device is a full-color display; and the coloring layer may be omitted or may be formed using a material which exhibits at least one color in the case where the liquid crystal display device is a monochrome display. Note that the color filter is not always provided in the case where light emitting diodes (LEDs) of RGB or the like are arranged in a backlight unit and a successive additive color mixing method (a field sequential method) in which color display is performed by time division is employed.

The pixel electrode layers 1701a, 1701b, and 1701e, the first common electrode layers 1705a, 1705b, and 1705e, and the second common electrode layers 1706a, 1706b, and 1706c may be formed using any one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organic indium, organotin, indium oxide containing tungsten oxide, indium zinc oxide containing tungsten oxide, indium oxide containing titanium oxide, and indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

As described above, in a passive-matrix liquid crystal display device using a blue phase liquid crystal layer, a contrast ratio can be increased.

This embodiment can be combined with the structure described in any of the other embodiments as appropriate.

(Embodiment 11)

A thin film transistor is manufactured, and a liquid crystal display device having a display function can be manufactured using the thin film transistor in a pixel portion and further in a driver circuit. Further, part or whole of a driver circuit can be formed over the same substrate as a pixel portion, using a thin film transistor, whereby a system-on-panel can be obtained.

The liquid crystal display device includes a liquid crystal element (also referred to as a liquid crystal display element) as a display element.

Further, a liquid crystal display device includes a panel in which a display element is sealed, and a module in which an IC or the like including a controller is mounted to the panel. The present invention further relates to one mode of an element substrate before the display element is completed in a process for manufacturing the liquid crystal display device, and the element substrate is provided with a means to supply current to the display element in each of a plurality of pixels. Specifically, the element substrate may be in a state after only a pixel electrode of the display element is formed, a state after a conductive film to be a pixel electrode is formed and before the conductive film is etched to form the pixel electrode, or any of other states.

Note that a liquid crystal display device in this specification means an image display device, a display device, or a light source (including a lighting device). Further, the liquid crystal display device includes any of the following modules in its category: a module to which a connector such as a flexible printed circuit (FPC), tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by a chip on glass (COG) method.

The appearance and a cross section of a liquid crystal display panel, which is one embodiment of a liquid crystal display device, is described with reference to FIGS. 12A1 and 12A2 and FIG. 12B. FIGS. 12A1 and 12A2 are top views of a panel in which thin film transistors 4010 and 4011 and a liquid crystal element 4013, which are formed over a first substrate 4001, are sealed between the first substrate 4001 and a second substrate 4006 with a sealant 4005. FIG. 12B is a cross-sectional view taken along the line M-N of FIGS. 12A1 and 12A2.

The sealant 4005 is provided so as to surround a pixel portion 4002 and a scanning line driver circuit 4004 which are provided over the first substrate 4001. The second substrate 4006 is provided over the pixel portion 4002 and the scanning line driver circuit 4004. Therefore, the pixel portion 4002 and the scanning line driver circuit 4004 are sealed together with a liquid crystal layer 4008, by the first substrate 4001, the sealant 4005, and the second substrate 4006.

In FIG. 12A1, a signal line driver circuit 4003 which is formed using a single crystal semiconductor film or a polycrystalline semiconductor film over a substrate separately prepared is mounted in a region which is different from the region surrounded by the sealant 4005 over the first substrate 4001. On the contrary, FIG. 12A2 illustrates an example in which part of a signal line driver circuit is formed with the use of a thin film transistor which is provided over the first substrate 4001. A signal line driver circuit 4003b is formed over the first substrate 4001 and a signal line driver circuit 4003a which is formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 12A1 illustrates an example of mounting the signal line driver circuit 4003 by a COG method, and FIG. 12A2 illustrates an example of mounting the signal line driver circuit 4003a by a TAB method.

The pixel portion 4002 and the scanning line driver circuit 4004 which are provided over the first substrate 4001 include a plurality of thin film transistors. FIG. 12B illustrates the thin film transistor 4010 included in the pixel portion 4002 and the thin film transistor 4011 included in the scanning line driver circuit 4004. An insulating layer 4020 and an interlayer film 4021 are provided over the thin film transistors 4010 and 4011.

Any of thin film transistors which are described in Embodiments 2 to 9 can be used as the thin film transistors 4010 and 4011. The thin film transistors 4010 and 4011 are n-channel thin film transistors.

In addition, over the first substrate 4001, a pixel electrode layer 4030 is formed over a first structure body 4037 which is provided over the interlayer film 4021 so as to project into the liquid crystal layer 4008 and the pixel electrode layer 4030 is electrically connected to the thin film transistor 4010. A second common electrode layer 4036 is also formed over the interlayer film 4021. The liquid crystal element 4013 includes the pixel electrode layer 4030, the first common electrode layer 4031, the second common electrode layer 4036, and the liquid crystal layer 4008. Note that a polarizing plate 4032 and a polarizing plate 4033 are provided on the outer sides of the first substrate 4001 and the second substrate 4006, respectively. The first common electrode layer 4031 is provided on a second substrate 4006 side and on a second structure body 4038 which is provided so as to project into the liquid crystal layer 4008, and the first common electrode layer 4031 is stacked over the pixel electrode layer 4030 and the second common electrode layer 4036 with the liquid crystal layer 4008 interposed therebetween.

As the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. Further, sheet in which aluminum foil is sandwiched by PVF films or polyester films can also be used.

A columnar spacer denoted by reference numeral 4035 is obtained by selective etching of an insulating film and is provided in order to control the thickness (a cell gap) of the liquid crystal layer 4008. Note that a spherical spacer may be used. In the liquid crystal display device using the liquid crystal layer 4008, the thickness (the cell gap) of the liquid crystal layer 4008 is preferably about 5 μm to 20 μm.

Although FIGS. 12A1 and 12A2 and FIG. 12B illustrate examples of transmissive liquid crystal display devices, an embodiment of the present invention can also be applied to a semi-transmissive liquid crystal display device.

Further, FIGS. 12A1 and 12A2 and FIG. 12B illustrate examples of liquid crystal display devices in which polarizing plates are provided on the outer side (the view side) of a pair of substrates; however, the polarizing plates may be provided on the inner side of the pair of the substrates. Whether the polarizing plate is provided on the inner side or the outer side may be determined as appropriate depending on the material of the polarizing plate and conditions of the manufacturing process. Furthermore, a light-blocking layer functioning as a black matrix may be provided.

The interlayer film 4021 is a chromatic-color light-transmitting resin layer and functions as a color filter layer. Moreover, part of the interlayer film 4021 may function as a light-blocking layer. In FIGS. 12A1 and 12A2 and FIG. 12B, a light-blocking layer 4034 is provided on the second substrate 4006 side so as to cover the thin film transistors 4010 and 4011. With the provision of the light-blocking layer 4034, contrast can be increased and the thin film transistors can be stabilized more.

The thin film transistors may be covered with the insulating layer 4020 which functions as a protective film of the thin film transistors; however, there is no particular limitation to such a structure.

Note that the protective film is provided to prevent entry of contaminant impurities floating in air, such as an organic substance, a metal substance, or moisture, and is preferably a dense film. The protective film may be formed by a sputtering method to have a single-layer structure or a stacked-layer structure including a silicon oxide film, a silicon nitride film, a silicon oxynitride film, a silicon nitride oxide film, an aluminum oxide film, an aluminum nitride film, an aluminum oxynitride film, and/or an aluminum nitride oxide film.

After the protective film is formed, the semiconductor layers may be subjected to annealing (300° C. to 400° C.).

Further, in the case of further forming a light-transmitting insulating layer as a planarizing insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed using these materials.

A method for forming the insulating layer to be stacked is not particularly limited, and the following method can be employed in accordance with the material: sputtering, an SOG method, spin coating, dip coating, spray coating, droplet discharging (for example, ink jetting, screen printing, or offset printing), doctor knifing, roll coating, curtain coating, knife coating, or the like. In the case where the insulating layer is formed using a material solution, the semiconductor layers may be annealed (at 200° C. to 400° C.) at the same time of a baking step. The baking step of the insulating layer serves also as the annealing step of the semiconductor layers, whereby a liquid crystal display device can be manufactured efficiently.

The pixel electrode layer 4030, the first common electrode layer 4031, and the second common electrode layer 4036 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

Moreover, the pixel electrode layer 4030, the first common electrode layer 4031, and the second common electrode layer 4036 may be formed using any one or more of the following: a metal such as tungsten (W), molybdenum (Mo), zirconium (Zr), hafnium (HO, vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

A conductive composition containing a conductive high molecule (also referred to as a conductive polymer) can be used for the pixel electrode layer 4030, the first common electrode layer 4031, and the second common electrode layer 4036.

In addition, a variety of signals and potentials are supplied to the signal line driver circuit 4003 that is formed separately, and the scanning line driver circuit 4004 or the pixel portion 4002 from an FPC 4018.

Further, since the thin film transistor is easily broken by static electricity and the like, a protection circuit for protecting the driver circuit is preferably provided over the same substrate for a gate line or a source line. The protection circuit is preferably formed using a nonlinear element.

In FIGS. 12A1 and 12A2 and FIG. 12B, a connection terminal electrode 4015 is formed using the same conductive film as that of the pixel electrode layer 4030, and a terminal electrode 4016 is formed using the same conductive film as that of source and drain electrode layers of the thin film transistors 4010 and 4011.

The connection terminal electrode 4015 is electrically connected to a terminal included in the FPC 4018 through an anisotropic conductive film 4019.

Although FIGS. 12A1 and 12A2 and FIG. 12B illustrate an example in which the signal line driver circuit 4003 is formed separately and mounted on the first substrate 4001, the present invention is not limited to this structure. The scanning line driver circuit may be formed separately and then mounted, or only part of the signal line driver circuit or part of the scanning line driver circuit may be formed separately and then mounted.

Figure 16:
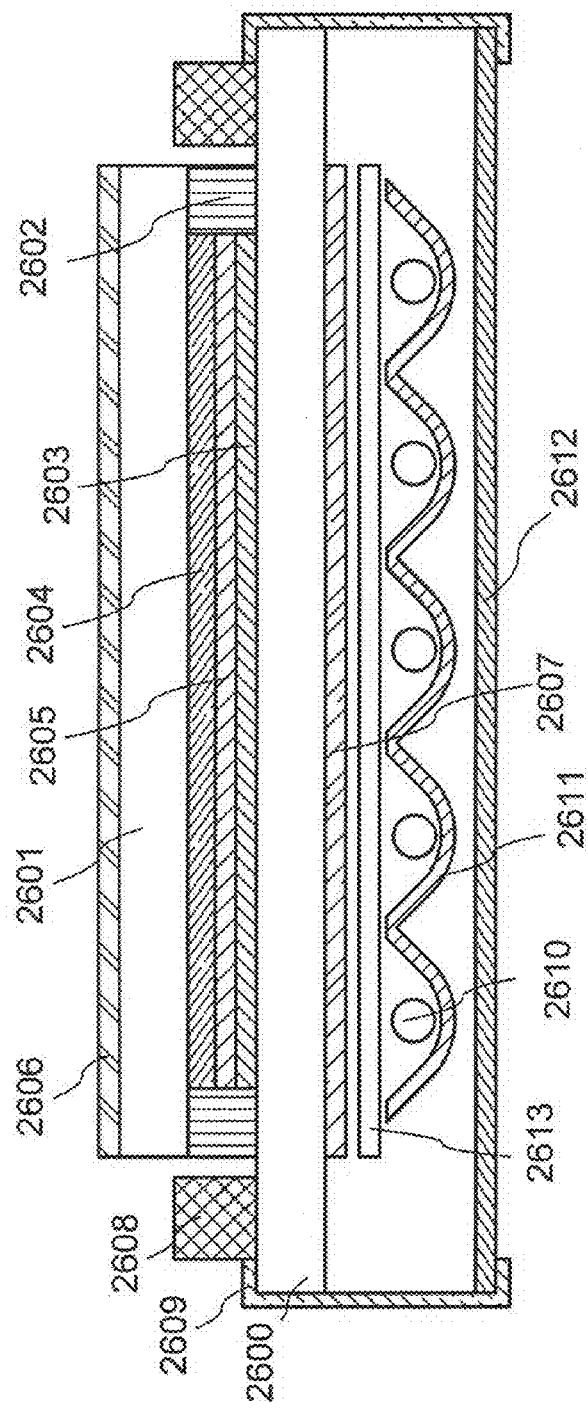
FIG. 16 is a cross-sectional view illustrating a liquid crystal display module.

FIG. 16 illustrates an example of a liquid crystal display module which is formed as a liquid crystal display device disclosed in this specification.

FIG. 16 illustrates an example of the liquid crystal display module in which an element substrate 2600 and a counter substrate 2601 are firmly attached to each other with a sealant 2602 and an element layer 2603 including a TFT or the like, a display element 2604 including a liquid crystal layer, and an interlayer film 2605 including a chromatic-color light-transmitting resin layer which functions as a color filter are provided between the substrates to form a display region. The interlayer film 2605 including a chromatic-color light-transmitting resin layer is necessary to perform color display. In the case of the RGB system, respective chromatic-color light-transmitting resin layers corresponding to colors of red, green, and blue are provided for respective pixels. A polarizing plate 2606, a polarizing plate 2607, and a diffuser plate 2613 are provided on outer sides of the element substrate 2600 and the counter substrate 2601. A light source includes a cold cathode tube 2610 and a reflective plate 2611. A circuit substrate 2612 is connected to a wiring circuit portion 2608 of the element substrate 2600 through a flexible wiring substrate 2609 and includes an external circuit such as a control circuit and a power source circuit. As the light source, a white diode may be used. The polarizing plate and the liquid crystal layer may be stacked with a retardation plate interposed therebetween.

Through the above steps, a highly reliable liquid crystal display panel as a liquid crystal display device can be manufactured.

This embodiment can be combined with the structure described in any of the other embodiments as appropriate.

(Embodiment 12)

A liquid crystal display device disclosed in this specification can be applied to a variety of electronic devices (including a game machine). Examples of electronic devices include television sets (also referred to as televisions or television receivers), monitors of computers or the like, cameras such as digital cameras or digital video cameras, digital photo frames, mobile phones (also referred to as cellular phones or mobile phone sets), portable game consoles, portable information terminals, audio reproducing devices, large-sized game machines such as pachinko machines, and the like.

Figure 13A:
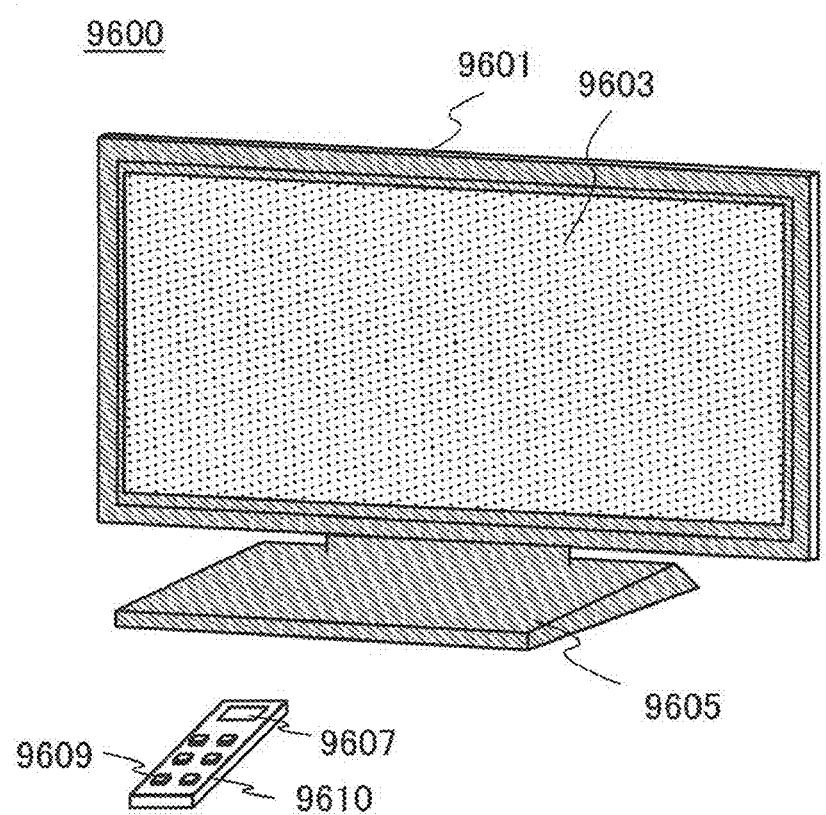
FIGS. 13A and 13B are external views illustrating examples of a television set and a digital photo frame.

FIG. 13A illustrates an example of a television set 9600. In the television set 9600, a display portion 9603 is incorporated in a housing 9601. Images can be displayed on the display portion 9603. Here, the housing 9601 is supported by a stand 9605.

The television set 9600 can be operated with an operation switch of the housing 9601 or a separate remote controller 9610. Channels and volume can be controlled with operation keys 9609 of the remote controller 9610 so that an image displayed on the display portion 9603 can be controlled. Furthermore, the remote controller 9610 may be provided with a display portion 9607 for displaying data output from the remote controller 9610.

Note that the television set 9600 is provided with a receiver, a modem, and the like. With the receiver, a general television broadcast can be received. Furthermore, when the television set 9600 is connected to a communication network by wired or wireless connection via the modem, one-way (from a transmitter to a receiver) or two-way (between a transmitter and a receiver, between receivers, or the like) data communication can be performed.

Figure 13B:
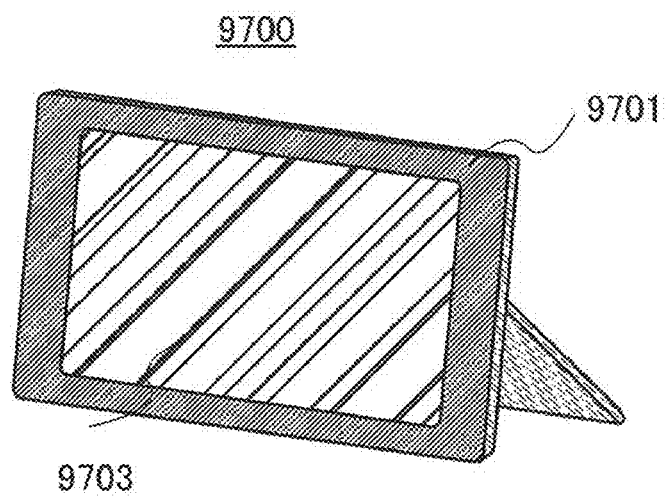

FIG. 13B illustrates an example of a digital photo frame 9700. For example, in the digital photo frame 9700, a display portion 9703 is incorporated in a housing 9701. Various images can be displayed on the display portion 9703. For example, the display portion 9703 can display data of an image shot by a digital camera or the like to function as a normal photo frame.

Note that the digital photo frame 9700 is provided with an operation portion, an external connection terminal (a USB a terminal which can be connected to various cables such as a USB cable, or the like), a recording medium insertion portion, and the like. Although they may be provided on the same surface as the display portion, it is preferable to provide them on the side surface or the back surface for the design of the digital photo frame 9700. For example, a memory storing data of an image shot by a digital camera is inserted in the recording medium insertion portion of the digital photo frame, whereby the image data can be downloaded and displayed on the display portion 9703.

The digital photo frame 9700 may have a configuration capable of wirelessly transmitting and receiving data. Through wireless communication, desired image data can be downloaded to be displayed.

Figure 14A:
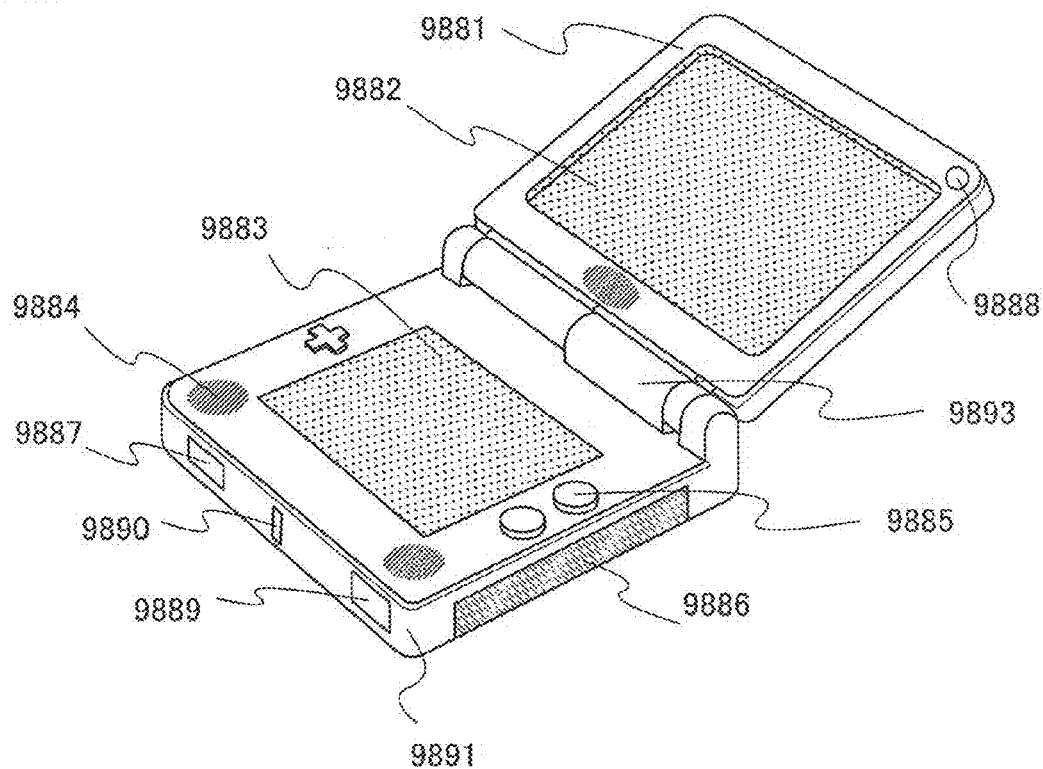
FIGS. 14A and 14B are external views illustrating examples of amusement machines.

FIG. 14A illustrates a portable game machine including a housing 9881 and a housing 9891 which are jointed with a connector 9893 so as to be able to open and close. A display portion 9882 and a display portion 9883 are incorporated in the housing 9881 and the housing 9891, respectively. The portable game machine illustrated in FIG. 14A additionally includes a speaker portion 9884, a storage medium insertion portion 9886, an LED lamp 9890, an input means (operation keys 9885, a connection terminal 9887, a sensor 9888 (a sensor having a function of measuring force, displacement, position, speed, acceleration, angular speed, the number of rotations, distance, light, liquid, magnetism, temperature, chemical substance, sound, time, hardness, electric field, current, voltage, electric power, radiation, flow rate, humidity, tilt angle, vibration, smell, or infrared ray), and a microphone 9889), and the like. It is needless to say that the structure of the portable game machine is not limited to the above and other structures provided with at least a liquid crystal display device disclosed in this specification may be employed. The portable game machine may include other accessory equipment as appropriate. The portable game machine illustrated in FIG. 14A has a function of reading out a program or data stored in a storage medium to display it on the display portion, and a function of sharing information with another portable game machine by wireless communication. The portable game machine in FIG. 14A can have various functions without limitation to the above.

Figure 14B:
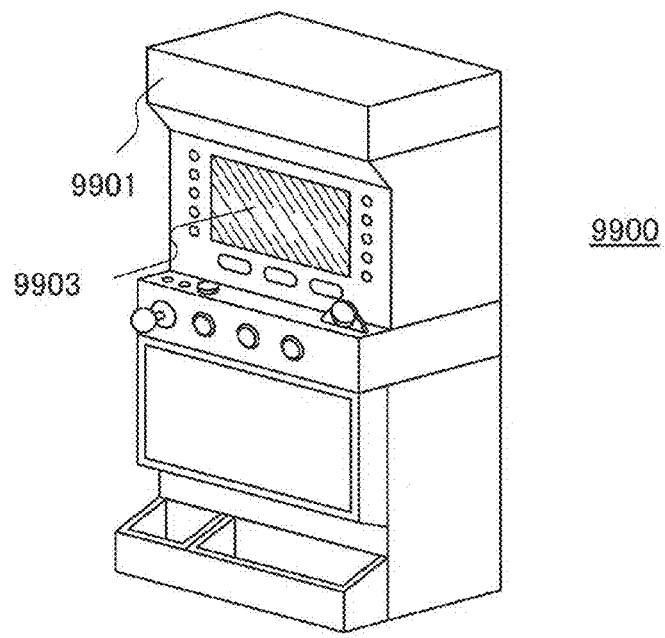

FIG. 14B illustrates an example of a slot machine 9900 which is a large-sized game machine. In the slot machine 9900, a display portion 9903 is incorporated in a housing 9901. In addition, the slot machine 9900 includes an operation means such as a start lever or a stop switch, a coin slot, a speaker, and the like. It is needless to say that the structure of the slot machine 9900 is not limited to the above and other structures provided with at least a liquid crystal display device disclosed in this specification may be employed. The slot machine may include other accessory equipment as appropriate.

Figure 15A:
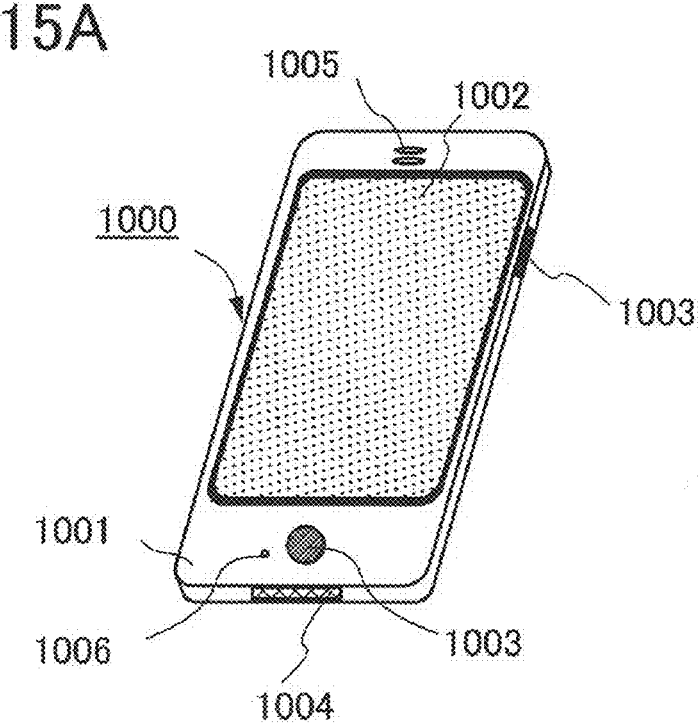
FIGS. 15A and 15B are external views illustrating examples of cellular phones.

FIG. 15A illustrates an example of a mobile phone 1000. The mobile phone 1000 is provided with a display portion 1002 incorporated in a housing 1001, operation buttons 1003, an external connection port 1004, a speaker 1005, a microphone 1006, and the like.

When the display portion 1002 of the mobile phone 1000 illustrated in FIG. 15A is touched with a finger or the like, data can be input into the mobile phone 1000. Furthermore, operations such as making calls and composing mails can be performed by touching the display portion 1002 with a finger or the like.

There are mainly three screen modes of the display portion 1002. The first mode is a display mode mainly for displaying an image. The second mode is an input mode mainly for inputting information such as text. The third mode is a display-and-input mode in which two modes of the display mode and the input mode are mixed.

For example, in the case of making a call or composing a mail, a text input mode mainly for inputting text is selected for the display portion 1002 so that text displayed on a screen can be input. In this case, it is preferable to display a keyboard or number buttons on almost all the area of the screen of the display portion 1002.

When a detection device including a sensor for detecting inclination, such as a gyroscope or an acceleration sensor, is provided inside the mobile phone 1000, display on the screen of the display portion 1002 can be automatically switched by determining the direction of the mobile phone 1000 (whether the mobile phone 1000 is placed horizontally or vertically).

The screen mode is switched by touching the display portion 1002 or operating the operation buttons 1003 of the housing 1001. Alternatively, the screen mode can be switched depending on the kind of images displayed on the display portion 1002. For example, when a signal of an image displayed on the display portion is data of moving image, the screen mode is switched to the display mode. When the signal is text data, the screen mode is switched to the input mode.

Furthermore, in the input mode, when input by touching the display portion 1002 is not performed for a certain period while a signal is detected by the optical sensor in the display portion 1002, the screen mode may be controlled so as to be switched from the input mode to the display mode.

The display portion 1002 can also function as an image sensor. For example, an image of a palm print, a fingerprint, or the like is taken by touching the display portion 1002 with the palm or the finger, whereby personal authentication can be performed. Furthermore, by providing a backlight or a sensing light source emitting a near-infrared light for the display portion, an image of a finger vein, a palm vein, or the like can also be taken.

Figure 15B:
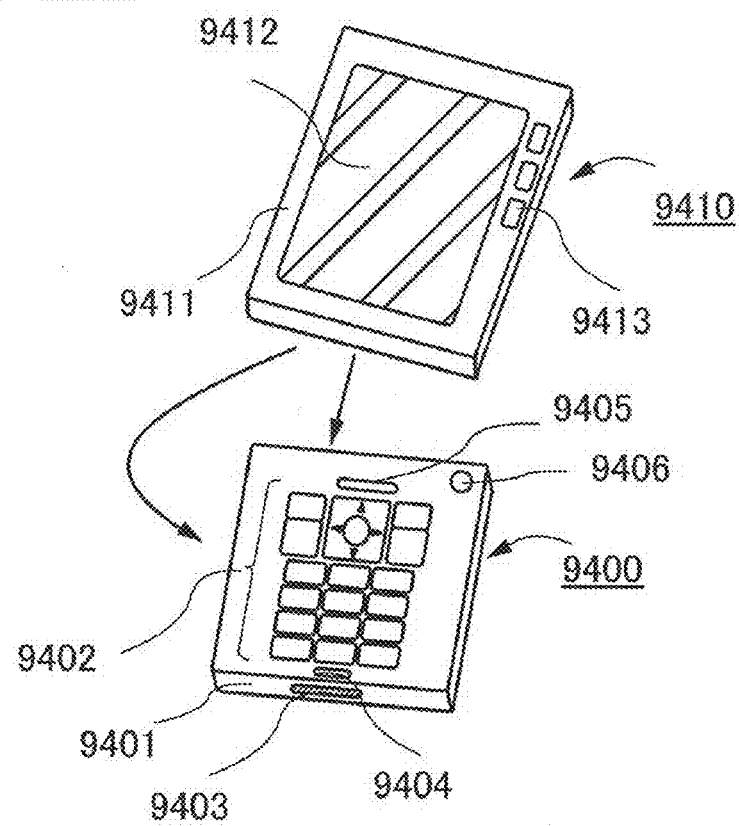

FIG. 15B also illustrates an example of a mobile phone. The mobile phone illustrated in FIG. 15B includes a display device 9410 having a display portion 9412 and operation buttons 9413 in a housing 9411 and a communication device 9400 having operation buttons 9402, an external input terminal 9403, a microphone 9404, a speaker 9405, and a light-emitting portion 9406 which emits light when receiving a call in a housing 9401. The display device 9410 having a display function can be detached from or attached to the communication device 9400 having a telephone function in two directions indicated by the arrows. Accordingly, the display device 9410 and the communication device 9400 can be attached to each other along their short sides or long sides. In addition, when only the display function is needed, the display device 9410 can be detached from the communication device 9400 and used alone. Images or input information can be transmitted or received by wireless or wired communication between the communication device 9400 and the display device 9410, each of which has a rechargeable battery.

This application is based on Japanese Patent Application serial no. 2009-018995 filed with Japan Patent Office on Jan. 30, 2009, the entire contents of which are hereby incorporated by reference.

What is claimed is:

1. A liquid crystal display device comprising:
a first substrate and a second substrate;
a liquid crystal layer including a blue phase liquid crystal material between the first substrate and the second substrate;
a structure body provided between the first substrate and the liquid crystal layer, the structure body projecting into the liquid crystal layer;
a first electrode layer provided between the liquid crystal layer and the structure body, the first electrode layer having a first opening pattern;
a second electrode layer provided between the second substrate and the liquid crystal layer, the second electrode layer having a second opening pattern; and
a third electrode layer provided between the first substrate and the liquid crystal layer and overlapped with the second electrode layer, the third electrode layer having a third opening pattern,
wherein the structure body is provided at least partly in the third opening pattern,
wherein a distance between the first electrode layer and the third electrode layer is smaller than a distance between the second electrode layer and the third electrode layer in a thickness direction of the liquid crystal layer, and
wherein a distance between the first electrode layer and the second electrode layer is substantially the same as the distance between the first electrode layer and the third electrode layer.

2. The liquid crystal display device according to claim 1, wherein the first electrode layer, the second electrode layer, and the third electrode layer are in contact with the liquid crystal layer.

3. The liquid crystal display device according to claim 1, wherein the first electrode layer, the second electrode layer, and the third electrode layer each have a comb shape.

4. The liquid crystal display device according to claim 1, wherein the liquid crystal layer includes a chiral agent.

5. The liquid crystal display device according to claim 1, wherein the liquid crystal layer includes a photocurable resin and a photopolymerization initiator.

6. The liquid crystal display device according to claim 1, wherein a thin film transistor is provided between the first substrate and the structure body, and
wherein a chromatic-color light-transmitting resin layer is provided between the thin film transistor and the structure body wherein the insulating film includes a chromatic color light transmitting resin layer.

7. The liquid crystal display device according to claim 1, wherein a thin film transistor is provided between the first substrate and the first structure body, and
wherein the light-blocking layer is provided between the thin film transistor and the liquid crystal layer wherein the insulating film includes the light blocking layer.

8. The liquid crystal display device according to claim 1, wherein the light-blocking layer is provided between the second substrate and the second electrode layer.

9. The liquid crystal display device according to claim 1, wherein a thin film transistor is provided between the first substrate and the structure body, and wherein the first electrode layer is electrically connected to the thin film transistor.

10. The liquid crystal display device according to claim 1, further comprising a light-blocking layer.

11. A liquid crystal display device comprising:
a first substrate and a second substrate;
a liquid crystal layer including a blue phase liquid crystal material between the first substrate and the second substrate;
a first structure body provided between the first substrate and the liquid crystal layer, the first structure body projecting into the liquid crystal layer;
a first electrode layer provided between the liquid crystal ayer and the first structure body, the first electrode layer having a first opening pattern;
a second structure body provided between the second substrate and the liquid crystal layer, the second structure body projecting into the liquid crystal layer;
a second electrode layer provided between the second structure body and the liquid crystal layer, the second electrode layer having a second opening pattern; and
a third electrode layer provided between the first substrate and the liquid crystal layer and overlapped with the second electrode layer, the third electrode layer having a third opening pattern,
wherein the first structure body is provided at east partly in the third opening pattern,
wherein a distance between the first electrode layer and the third electrode layer is smaller than a distance between the second electrode layer and the third electrode layer in a thickness direction of the liquid crystal layer, and
wherein a distance between the first electrode layer and the second electrode layer is substantially the same as the distance between the first electrode layer and the third electrode layer.

12. The liquid crystal display device according to claim 11, wherein the first electrode layer, the second electrode layer, and the third electrode layer are in contact with the liquid crystal layer.

13. The liquid crystal display device according to claim 11, wherein the first electrode layer, the second electrode layer, and the third electrode layer each have a comb shape.

14. The liquid crystal display device according to claim 11, wherein the liquid crystal layer includes a chiral agent.

15. The liquid crystal display device according to claim 11, wherein the liquid crystal layer includes a photocurable resin and a photopolymerization initiator.

16. The liquid crystal display device according to claim 11, wherein a thin film transistor is provided between the first substrate and the first structure body, and wherein the first electrode layer is electrically connected to the thin film transistor.

17. The liquid crystal display device according to claim 16, wherein a chromatic-color light-transmitting resin layer is provided between the thin film transistor and the first structure body.

18. The liquid crystal display device according to claim 16, further comprising a light-blocking layer,
wherein the light-blocking layer is provided between the thin film transistor and the liquid crystal layer.

19. The liquid crystal display device according to claim 16, further comprising a light-blocking layer,
wherein the light-blocking layer is provided between the second substrate and the second electrode layer.

20. The liquid crystal display device according to claim 11, further comprising a light-blocking layer.

21. A liquid crystal display device comprising:
a first substrate and a second substrate;
a liquid crystal layer including a blue phase liquid crystal material between the first substrate and the second substrate;
a first structure body provided between the first substrate and the liquid crystal layer, the first structure body projecting into the liquid crystal layer;
a first electrode layer provided between the liquid crystal layer and the first structure body, the first electrode layer having a first opening pattern;
a second structure body provided between the second substrate and the liquid crystal layer, the second structure body projecting into the liquid crystal layer;
a second electrode layer provided between the second structure body and the liquid crystal layer, the second electrode layer having a second opening pattern;
a third structure body provided between the first substrate and the liquid crystal layer, the third structure body projecting into the liquid crystal layer; and
a third electrode layer provided between the liquid crystal layer and the third structure body and overlapped with the second electrode layer, the third electrode layer having a third opening pattern,
wherein the first structure body is provided at least partly in the third opening pattern,
wherein a distance between the first electrode layer and the third electrode layer is smaller than a distance between the second electrode layer and the third electrode layer in a thickness direction of the liquid crystal layer, and
wherein a distance between the first electrode layer and the second electrode layer is substantially the same as the distance between the first electrode layer and the third electrode layer.

22. The liquid crystal display device according to claim 21, wherein the first electrode layer, the second electrode layer, and the third electrode layer are in contact with the liquid crystal layer.

23. The liquid crystal display device according to claim 21, wherein the first electrode layer, the second electrode layer, and the third electrode layer each have a comb shape.

24. The liquid crystal display device according to claim 21, wherein the liquid crystal layer includes a chiral agent.

25. The liquid crystal display device according to claim 21, wherein the liquid crystal layer includes a photocurable resin and a photopolymerization initiator.

26. The liquid crystal display device according to claim 21, wherein a thin film transistor is provided between the first substrate and the first structure body, and wherein the first electrode layer is electrically connected to the thin film transistor.

27. The liquid crystal display device according to claim 26, wherein a chromatic-color light-transmitting resin layer is provided between the thin film transistor and the first structure body.

28. The liquid crystal display device according to claim 26, further comprising a light-blocking layer, wherein the light-blocking layer is provided between the thin film transistor and the liquid crystal layer.

29. The liquid crystal display device according to claim 26, further comprising a light-blocking layer, wherein the light-blocking layer is provided between the second substrate and the second electrode layer.

30. The liquid crystal display device according to claim 26, further comprising a light-blocking layer.

* * * * *

UNITED STATES PATENT AND TRADEMARK OFFICE
CERTIFICATE OF CORRECTION

PATENT NO. : 8,395,740 B2
APPLICATION NO. : 12/690134
DATED : March 12, 2013
INVENTOR(S) : Daisuke Kubota et al.

It is certified that error appears in the above-identified patent and that said Letters Patent is hereby corrected as shown below:

In the Specifications:

Col. 7, line 8, "231*e*" should read --231*c*--.

Col. 7, line 27, "231*e*" should read --231*c*--.

Col. 8, line 25, "232*e*" should read --232*c*--.

Col. 8, line 61, "µM," should read --µm,--.

Col. 9, line 48, "foamed" should read --formed--.

Col. 14, line 26, "213" should read --2B--.

Col. 16, line 4, "5C," should read --8C,--.

Col. 16, line 59, "ease" should read --case--.

Col. 19, line 47, "(Hp," should read --(Hf)--.

Col. 24, line 41, "first 15" should read --first--.

Col. 25, line 17, "foamed" should read --formed--.

Col. 28, line 29, "thinly" should read --firmly--.

Col. 34, line 49, "1701*e*" should read --1701*c*--.

Col. 34, line 50, "1705*e*" should read --1705*c*--.

Col. 37, line 62, "(HO," should read --(Hf)--.

Col. 39, line 35, "USB a" should read --USB terminal, a--.

In the Claims:

Col. 42, line 32, "ayer" should read --layer--.

Col. 42, line 44, "east" should read --least--.

Col. 44, line 40, "claim 26" should read --claim 21--.

Signed and Sealed this
Twentieth Day of August, 2013

Teresa Stanek Rea
*Acting Director of the United States Patent and Trademark Office*